US012420291B2

(12) United States Patent
Martensson et al.

(10) Patent No.: US 12,420,291 B2
(45) Date of Patent: Sep. 23, 2025

(54) JETTING DEVICES WITH FLEXIBLE JETTING NOZZLE

(71) Applicant: Mycronic AB, Taby (SE)

(72) Inventors: Gustaf Martensson, Solna (SE); Nerijus Augustis, Stockholm (SE)

(73) Assignee: Mycronic AB, Taby (SE)

( * ) Notice: Subject to any disclaimer, the term of this patent is extended or adjusted under 35 U.S.C. 154(b) by 558 days.

(21) Appl. No.: 17/793,242

(22) PCT Filed: Jan. 28, 2021

(86) PCT No.: PCT/EP2021/051911

§ 371 (c)(1),
(2) Date: Jul. 15, 2022

(87) PCT Pub. No.: WO2021/151971

PCT Pub. Date: Aug. 5, 2021

(65) Prior Publication Data

US 2023/0058541 A1 Feb. 23, 2023

(30) Foreign Application Priority Data

Jan. 28, 2020 (SE) .................................... 2050072-4

(51) Int. Cl.
*B05B 1/08* (2006.01)
*B05B 9/04* (2006.01)
*B05C 5/02* (2006.01)

(52) U.S. Cl.
CPC ............ *B05B 1/086* (2013.01); *B05B 9/0413* (2013.01); *B05C 5/0225* (2013.01)

(58) Field of Classification Search
CPC ......... B05B 1/086; B05B 1/02; B05B 9/0413; B05C 5/0225; B05C 11/1034
(Continued)

(56) References Cited

U.S. PATENT DOCUMENTS 2,998,198 A * 8/1961 Young ........................ B05B 1/32
239/602
3,711,020 A * 1/1973 Zelna ........................ B23K 1/06
239/602
(Continued)

FOREIGN PATENT DOCUMENTS

CN 104174549 A 12/2014
CN 105210459 A 12/2015
(Continued)

OTHER PUBLICATIONS

International Search Report for International Application No. PCT/EP2021/051911 dated May 18, 2021.
(Continued)

*Primary Examiner* — Cody J Lieuwen
(74) *Attorney, Agent, or Firm* — Harness, Dickey & Pierce, P.L.C.

(57) ABSTRACT

A device configured to jet one or more droplets of a viscous medium may include a housing having an inner surface at least partially defining a jetting chamber configured to hold the viscous medium, and a flexible jetting nozzle. The flexible jetting nozzle may include a flexible conduit extending between an inlet orifice in an inner surface to an outlet orifice in an outer surface. The device may cause an increase of internal pressure of viscous medium in the jetting chamber to force one or more droplets of viscous medium through the flexible conduit and through the outlet orifice. The flexible jetting nozzle may include a flexible material. The flexible jetting nozzle may deform, to cause a cross-sectional area of the flexible conduit to dilate, in response to the increase of the internal pressure of the viscous medium in the jetting chamber.

16 Claims, 12 Drawing Sheets

(58) Field of Classification Search
USPC ............................................ 239/533.13, 602
See application file for complete search history.

(56) References Cited

U.S. PATENT DOCUMENTS

| | | | | |
|---|---|---|---|---|
| 4,534,914 | A * | 8/1985 | Takahashi | B01F 33/403 239/533.13 |
| 6,253,957 | B1 * | 7/2001 | Messerly | B05C 5/0225 222/61 |
| 6,267,266 | B1 * | 7/2001 | Smith | G01F 13/006 222/61 |
| 6,464,150 | B1 * | 10/2002 | Zimmer | B05B 1/323 239/602 |
| 2008/0302828 | A1 * | 12/2008 | Pozzi | B65D 47/2056 222/189.09 |
| 2012/0085842 | A1 | 4/2012 | Ciardella et al. | |
| 2013/0105597 | A1 * | 5/2013 | Dunlap | G01F 11/029 239/296 |
| 2016/0325294 | A1 * | 11/2016 | MacIndoe | B05B 1/32 |
| 2018/0086094 | A1 * | 3/2018 | Sakai | B41J 2/04581 |

FOREIGN PATENT DOCUMENTS

| | | | |
|---|---|---|---|
| KR | 10-2015-0128674 | A | 11/2015 |
| WO | WO-9956889 | A1 | 11/1999 |
| WO | WO-2016032746 | A1 | 3/2016 |
| WO | WO-2019011672 | A1 | 1/2019 |
| WO | WO-2020005929 | A2 | 1/2020 |

OTHER PUBLICATIONS

International Preliminary Report on Patentability for International Application No. PCT/EP2021/051911 dated Apr. 20, 2022.

Chinese Office Action dated Nov. 28, 2023 for corresponding Chinese Application No. 202180008540.2, and English-language translation thereof.

* cited by examiner

JETTING DEVICES WITH FLEXIBLE JETTING NOZZLE

BACKGROUND

Technical Field

Example embodiments described herein generally relate to the field of "jetting" droplets of a viscous medium onto a substrate. More specifically, the example embodiments relate to improving the performance of a jetting device, and a jetting device configured to "jet" droplets of viscous medium onto a substrate.

Related Art

Jetting devices are known and are primarily intended to be used for, and may be configured to implement, jetting droplets of viscous medium, e.g. solder paste or glue, onto a substrate, prior to mounting of components thereon.

A jetting device (also referred to herein as simply a "device") may include a nozzle space (also referred to herein as a jetting chamber) configured to contain a relatively small volume ("amount") of viscous medium prior to jetting, a jetting nozzle (also referred to herein as an eject nozzle) coupled to (e.g., in communication with) the nozzle space, an impacting device configured to impact and jet the viscous medium from the nozzle space through the jetting nozzle in the form of droplets, and a feeder configured to feed the medium into the nozzle space.

In some cases, good and reliable performance of the device may be a relatively important factor in the implementation of the above two measures, as well as a high degree of accuracy and a maintained high level of reproducibility during an extended period of time. In some cases, absence of such factors may lead to unintended variation in deposits on workpieces, (e.g., circuit boards), which may lead to the presence of errors in such workpieces. Such errors may reduce reliability of such workpieces. For example, unintended variation in one or more of deposit size, deposit placement, deposit shape, etc. on a workpiece that is a circuit board may render the circuit board more vulnerable to bridging, short circuiting, etc.

In some cases, good and reliable control of droplet size may be a relatively important factor in the implementation of the above two measures. In some cases, absence of such control may lead to unintended variation in deposits on workpieces, (e.g., circuit boards), which may lead to the presence of errors in such workpieces. Such errors may reduce reliability of such workpieces. For example, unintended variation in one or more of deposit size, deposit placement, deposit shape, etc. on a workpiece that is a circuit board may render the circuit board more vulnerable to bridging, short circuiting, etc.

SUMMARY

According to some example embodiments, a device configured to jet one or more droplets of a viscous medium may include a housing having an inner surface at least partially defining a jetting chamber configured to hold the viscous medium, and a flexible jetting nozzle. The flexible jetting nozzle may have an inner surface at least partially exposed to the jetting chamber. The flexible jetting nozzle may include a flexible conduit extending between an inlet orifice in the inner surface to an outlet orifice in an outer surface of the flexible jetting nozzle. The device may be configured to cause an increase of internal pressure of viscous medium in the jetting chamber to force the one or more droplets of the viscous medium through the flexible conduit and through the outlet orifice of the flexible jetting nozzle. The flexible jetting nozzle may include a flexible material, such that the flexible jetting nozzle is configured to deform to cause a cross-sectional area of the flexible conduit to dilate in response to the increase of the internal pressure of the viscous medium in the jetting chamber.

The device may further include an impacting device including an impact end surface at least partially defining the jetting chamber. The impacting device may be configured to cause the increase of internal pressure of viscous medium in the jetting chamber by moving through at least a portion of a space defined by one or more inner surfaces of the housing to reduce a volume of the jetting chamber.

The impacting device may include a piezoelectric actuator

The flexible jetting nozzle may be configured to reversibly deform to cause the cross-sectional area of the flexible conduit to reversibly dilate in response to reversible variation of the internal pressure of the viscous medium in the jetting chamber.

The flexible material may have a Young's Modulus value of about 1.0 GPa to about 3.0 GPa.

The flexible jetting nozzle may be configured to deform to cause the cross-sectional area of the flexible conduit to dilate by about 50% to about 1000% in response to the increase of the internal pressure of the viscous medium in the jetting chamber. The flexible jetting nozzle may be configured to deform to cause the cross-sectional area of the flexible conduit to dilate by about 400% in response to the increase of the internal pressure of the viscous medium in the jetting chamber The device may further include a rigid jetting nozzle having an inner surface and an outer surface. The rigid jetting nozzle may include a rigid conduit extending between an inlet orifice in the inner surface of the rigid jetting nozzle and an outlet orifice in the outer surface of the rigid jetting nozzle. The flexible jetting nozzle may be coupled to the rigid jetting nozzle, such that the rigid jetting nozzle is configured to hold the flexible jetting nozzle in place, and the device is configured to cause the internal pressure of the viscous medium in the jetting chamber to increase to force the one or more droplets of the viscous medium through both the flexible conduit and the rigid conduit.

The rigid jetting nozzle and the housing may be a single, uniform part.

The rigid jetting nozzle may be at least partially between the flexible jetting nozzle and the jetting chamber, such that the flexible jetting nozzle is at least partially isolated from the jetting chamber by the rigid jetting nozzle.

The flexible jetting nozzle may be at least partially between the rigid jetting nozzle and the jetting chamber.

The flexible conduit may extend at least partially through the rigid conduit.

According to some example embodiments, a method may be provided for controlling a jetting of one or more droplets of a viscous medium from a jetting chamber of a device and through a flexible jetting nozzle of the device. The device may include a housing having an inner surface at least partially defining the jetting chamber, the flexible jetting nozzle having an inner surface at least partially exposed to the jetting chamber, the flexible jetting nozzle including a flexible conduit extending between an inlet orifice in an inner surface of the flexible jetting nozzle to an outlet orifice in an outer surface of the flexible jetting nozzle, the flexible jetting nozzle including a flexible material. The method may include causing an internal pressure of viscous medium in the jetting chamber to increase to cause at least a portion of the flexible jetting nozzle to deform, to cause a cross-sectional flow area of at least a portion of the flexible conduit to dilate, and causing the internal pressure of viscous medium in the jetting chamber to decrease to cause the portion of the flexible jetting nozzle to relax, to cause the cross-sectional flow area of the portion of the flexible conduit to contract.

The increase in the internal pressure of viscous medium in the jetting chamber may cause the portion of the flexible jetting nozzle to deform from a rest state to a deformed state, to cause the cross-sectional flow area of the portion of the flexible conduit to dilate from a first area to a second area, the second area greater than the first area. The decrease in the internal pressure of viscous medium in the jetting chamber may cause the portion of the flexible jetting nozzle to relax from the deformed state to the rest state, to cause the cross-sectional flow area of the portion of the flexible conduit to contract from the second area to the first area.

The second area may be about 200% to about 400% greater than the first area.

The increase in the internal pressure of viscous medium in the jetting chamber may be based on causing an impacting device to move in the jetting device to reduce a volume of the jetting chamber. The decrease in the internal pressure of viscous medium in the jetting chamber may be based on causing the impacting device to move in the jetting device to increase the volume of the jetting chamber.

The impacting device may include a piezoelectric actuator.

The flexible jetting nozzle may be at least partially isolated from the jetting chamber by a rigid jetting nozzle, such that the increase in the internal pressure of viscous medium in the jetting chamber causes a limited portion of the flexible jetting nozzle that is exposed to the jetting chamber by the rigid jetting nozzle to deform while a remainder portion of the flexible jetting nozzle that is isolated from exposure to the jetting chamber by the rigid jetting nozzle is restricted in deformation.

The flexible jetting nozzle may be at least partially between the jetting chamber and a rigid jetting nozzle, where the rigid jetting nozzle includes a rigid conduit, such that the increase in the internal pressure of viscous medium in the jetting chamber causes a limited portion of the flexible jetting nozzle that is aligned with the rigid conduit to deform while a remainder portion of the flexible jetting nozzle that is not aligned with the rigid conduit is restricted in deformation by the rigid jetting nozzle.

The limited portion of the flexible conduit may extend at least partially through the rigid conduit.

BRIEF DESCRIPTION OF THE DRAWINGS

Some example embodiments will be described with regard to the drawings. The drawings described herein are for illustration purposes only and are not intended to limit the scope of the present disclosure in any way.

DETAILED DESCRIPTION

Figure 1:
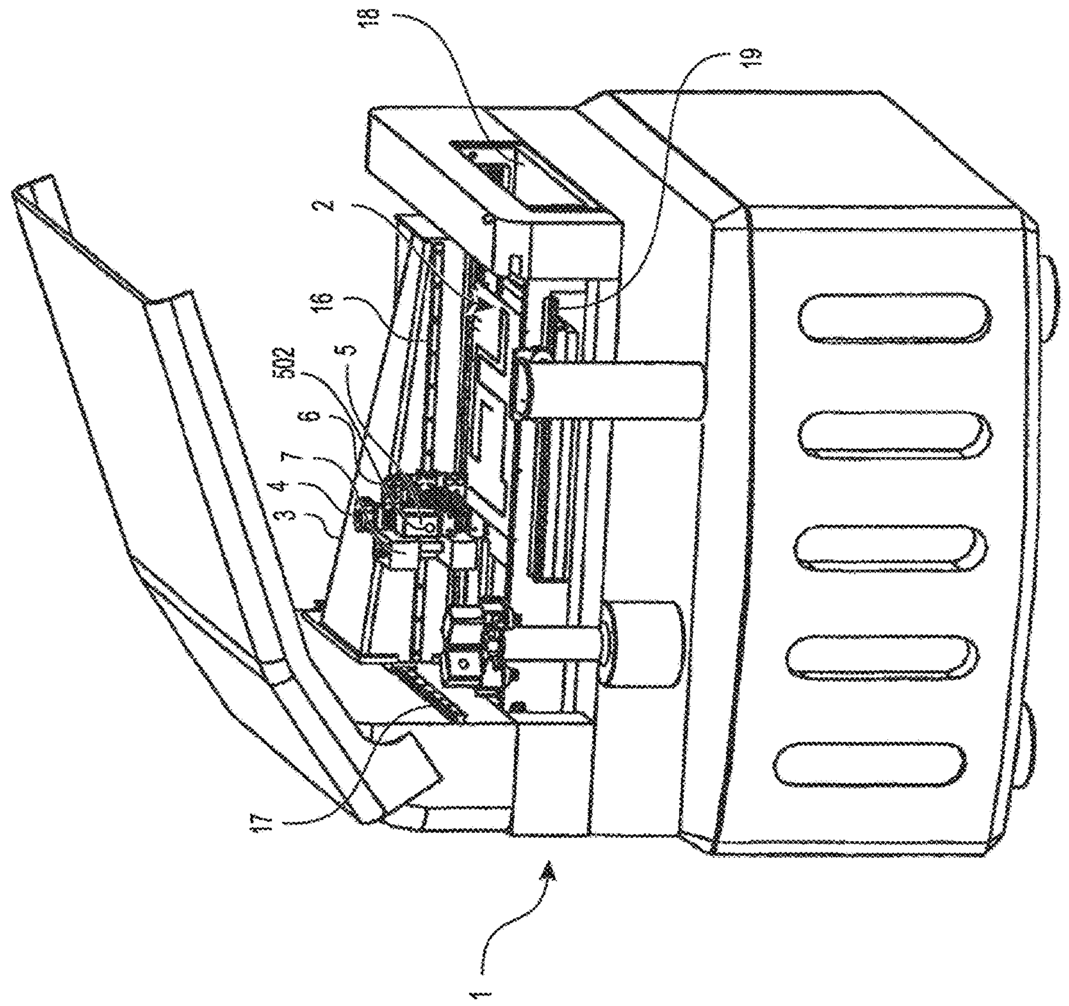
FIG. 1 is a perspective view illustrating a jetting device according to some example embodiments of the technology disclosed herein.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only the example embodiments set forth herein.

It should be understood that there is no intent to limit example embodiments to the particular ones disclosed, but on the contrary example embodiments are to cover all modifications, equivalents, and alternatives falling within the appropriate scope. Like numbers refer to like elements throughout the description of the figures.

Example embodiments of the technology disclosed herein are provided so that this disclosure will be thorough, and will fully convey the scope to those who are skilled in the art. Numerous specific details are set forth such as examples of specific components, devices, and methods, to provide a thorough understanding of implementations of the technology disclosed herein. It will be apparent to those skilled in the art that specific details need not be employed, that example embodiments of the technology disclosed herein may be embodied in many different forms and that neither should be construed to limit the scope of the disclosure. In some example embodiments of the technology disclosed herein, well-known processes, well-known device structures, and well-known technologies are not described in detail.

The terminology used herein is for the purpose of describing particular example embodiments of the technology disclosed herein only and is not intended to be limiting. As used herein, the singular forms "a", "an" and "the" may be intended to include the plural forms as well, unless the context clearly indicates otherwise. The terms "comprises," "comprising," "includes," "including," "has," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, regions, layers and/or sections should not be limited by these terms. These terms may be only used to distinguish one element, component, region, layer and/or section from another region, layer and/or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments of the technology disclosed herein.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

When the words "about" and "substantially" are used in this specification in connection with a numerical value, it is intended that the associated numerical value include a tolerance of ±10% around the stated numerical value, unless otherwise explicitly defined.

In the context of the present application, it is to be noted that the term "viscous medium" should be understood as highly viscous medium with a viscosity (e.g., dynamic viscosity) typically about or above 1 Pa s (e.g., solder paste, solder flux, adhesive, conductive adhesive, or any other kind of medium of fluid used for fastening components on a substrate, conductive ink, resistive paste, nano-cellulose suspensions, food products, emulsions, melted plastics, biological inks, or the like, all typically with a viscosity about or above 1 Pa s). The term "jetted droplet," "droplet," or "shot" should be understood as the volume of the viscous medium that is forced through the jetting nozzle and moving towards the substrate in response to an impact of the impacting device.

In the context of the present application, it is noted that the term "jetting" should be interpreted as a non-contact deposition process that utilizes a fluid jet to form and shoot droplets of a viscous medium from a jetting nozzle onto a substrate, as compared to a contact dispensing process, such as "fluid wetting". In contrast to a dispenser and dispensing process where a needle in combination with, for contact dispensing, the gravitation force and adhesion force with respect to the surface is used to dispense viscous medium on a surface, an ejector or jetting head assembly for jetting or shooting viscous medium should be interpreted as an apparatus including an impacting device, such as an impacting device including, for example, a piezoelectric actuator and a plunger, for rapidly building up pressure in a jetting chamber by the rapid movement (e.g., rapid controlled mechanical movement) of an impacting device (e.g., the rapid movement of a plunger) over a period of time that is more than about 1 microseconds, but less than about 50 microseconds, thereby providing a deformation of the fluid in the chamber that forces droplets of viscous medium through a jetting nozzle. In one implementation, an ejection control unit applies a drive voltage intermittently to a piezoelectric actuator, thereby causing an intermittent extension thereof, and a reciprocating movement of a plunger with respect to the assembly housing of the ejector or jetting head assembly head.

"Jetting" of viscous medium should be interpreted as a process for ejecting or shooting droplets of viscous medium where the jetting of droplets of the viscous medium onto a surface is performed while the at least one jetting nozzle is in motion without stopping at each location on the workpiece where viscous medium is to be deposited. Jetting of viscous medium should be interpreted as a process for ejecting or shooting droplets of viscous medium where the ejection of a droplet through a nozzle is controlled by an impacting device building up a rapid pressure impulse in a jetting chamber over a time period that typically is more than about 1 microseconds and less than about 50 microseconds. For the movement of the impacting device to be rapid enough to build up a pressure impulse in the jetting chamber to force individual droplets or shots of the relatively highly viscous fluids (with a viscosity of about or above 1 Pa s) out of the chamber through the jetting nozzle, the break-off is induced by the impulse of the shot itself and not by gravity or the movement of a needle in an opposite direction. A volume of each individual droplet to be jetted onto the workpiece may be between about 100 pL and about 30 nL. A dot diameter for each individual droplet may be between about 0.1 mm and about 1.0 mm. The speed of the jetting, i.e. the speed of each individual droplet, may be between about 5 m/s and about 50 m/s. The speed of the jetting mechanism, e.g. the impacting mechanism for impacting the jetting nozzle, may be as high as between about 5 m/s and about 10 m/s but is typically smaller than the speed of the jetting, e.g. between about 1 m/s and about 10 m/s, and depends on the transfer of momentum through the nozzle.

The terms "jetting" and "jetting head assembly" in this disclosure and the claims, refer to the break-off of a fluid filament (e.g., of viscous medium) induced by the motion of the fluid element in contrast to a slower natural break-off akin to dripping where the a break-off of a fluid filament is driven for example by gravity or capillary forces.

In order to distinguish "jetting" of droplets of a viscous medium using a "jetting head assembly" such as an ejector-based non-contact jetting technology from the slower natural dripping break-off driven by gravity or capillary forces, we introduce below non-dimensional numbers that describe a threshold for the dripping-jetting transition for filament break-off for different cases and fluids that are driven by different physical mechanisms.

For elastic fluids, the terms "jetting" and "jetting head assembly" refer to the definition of jetting droplets by reference to the Weissenberg number, $Wi=\lambda U_{jet}/R$, where $\lambda$ is the dominant relaxation time of the fluid, $U_{jet}$ is the speed of the fluid and R is the radius of the jet, can be used and the threshold for dripping-jetting is approximately $20<Wi_{th}<40$.

For fluids where break-off is controlled by viscous thinning, the terms "jetting" and "jetting head assembly" refer to the definition of jetting droplets by reference to the Capillary number, described by $Ca=\eta_0 U_{jet}/\gamma$, where $\eta_0$ is the yield viscosity and $\gamma$ is the surface tension, can be used to introduce a threshold for dripping-jetting of $Ca_{th}\approx 10$.

For fluids where break-off is dominated by inertial dynamics, the terms "jetting" and "jetting head assembly" refer to the definition of jetting droplets by reference to the Weber number, expressed as $\rho U^2 jetR/\gamma$, where $\rho$ is the fluid density, can be used to introduce a jetting-dripping threshold of $We_{th}\approx 1$.

The ability to eject a more precise and/or accurate volume of viscous medium from a given distance at a specific position on a workpiece while in motion are hallmarks of viscous jetting. These characteristics allow the application of relatively highly viscous fluids (e.g., above 1 Pa s) while compensating for a considerable height variation on the workpiece (h=about 0.4 to about 4 mm). The volumes are relatively large compared to ink jet technology (between about 100 pL and about 30 nL) as are the viscosities (viscosities of about or above 1 Pa s).

Typically, a jetting device is software controlled. The software needs instructions for how to apply the viscous medium to a specific substrate or according to a given (or alternatively, desired or predetermined) jetting schedule or jetting process. These instructions are called a "jetting program". Thus, the jetting program supports the process of jetting droplets of viscous medium onto the substrate, which process also may be referred to as "jetting operation". The jetting program may be generated by a pre-processing step performed off-line, prior to the jetting operation.

As discussed herein, "viscous medium" may be solder paste, flux, adhesive, conductive adhesive, or any other kind ("type") of medium used for fastening components on a substrate, conductive ink, resistive paste, or the like. However, example embodiments of the technology disclosed herein should not be limited to only these examples.

A "substrate" may be a "workpiece." A workpiece may be any carrier, including any carrier of electronic components. A workpiece may include, but is not limited to, a piece of glass, a piece of silicon, a piece of one or more organic material-based substrates, a printed circuit board, a piece of plastic paper, any combination thereof, or any other type of carrier material. A workpiece may be a board (e.g., a printed circuit board (PCB) and/or a flexible PCB), a substrate for ball grid arrays (BGA), chip scale packages (CSP), quad flat packages (QFP), wafers, flip-chips, or the like.

It is also to be noted that the term "jetting" should be interpreted as a non-contact dispensing process that utilizes a fluid jet to form and shoot one or more droplets of a viscous medium from a jet nozzle onto a substrate, as compared to a contact dispensing process, such as "fluid wetting." It is also to be noted that the term "jetting," and any "jetting operation" as described herein, may include the incremental jetting of one or more droplets to incrementally form one or more deposits on a substrate. But it will also be understood that the term "jetting," and any "jetting operation" as described herein, is not limited to the incremental jetting of one or more droplets to incrementally form one or more deposits on a substrate. For example, the term "jetting," and any "jetting operation" as described herein, may encompass a "screen printing" operation, as the term is well-known, for example where a viscous medium is transferred to a substrate so that multiple deposits are formed on a substrate simultaneously or substantially simultaneously (e.g., simultaneously within manufacturing tolerances and/or material tolerances).

The term "deposit" may refer to a connected amount of viscous medium applied at a position on a workpiece as a result of one or more jetted droplets.

For some example embodiments, the solder paste may include between about 40% and about 60% by volume of solder balls and the rest of the volume may be solder flux.

In some example embodiments, the volume percent of solder balls of average size may be in the range of between about 5% and about 40% of the entire volume of solid phase material within the solder paste. In some example embodiments, the average diameter of the first fraction of solder balls may be within the range of between about 2 and about 5 microns, while the average diameter of a second fraction of solder balls may be between about 10 and about 30 microns.

The term "deposit size" refers to the area on the workpiece, such as a substrate, that a deposit will cover. An increase in the droplet volume generally results in an increase in the deposit height as well as the deposit size.

In some example embodiments, a jetting device may include a jetting chamber communicating with a supply of viscous medium, and a nozzle ("jetting nozzle") communicating with the jetting chamber. The jetting chamber may be at least partially defined by one or more inner surfaces of a housing of the jetting device and one or more surfaces of the jetting nozzle. One or more surfaces of the impacting device, including an impact end surface, may be understood to at least partially define the jetting chamber. Prior to the jetting of a droplet, the jetting chamber may be supplied with viscous medium from the supply of viscous medium. Then, the volume of the jetting chamber may be rapidly reduced (e.g., based on movement of the impacting device through a portion of the housing), causing a well-defined volume and/or mass ("amount") of viscous medium to be forced with high velocity out of the orifice or exit hole ("outlet orifice") of the jetting nozzle and onto a substrate, thus forming a deposit or dot of viscous medium on the substrate. The jetted amount (e.g., the amount of viscous medium that is forced through the outlet orifice and thus out of the jetting device) is hereinafter referred to as a droplet or a jet.

In some example embodiments, the jetting nozzle is a flexible jetting nozzle having an inner surface at least partially exposed to the jetting chamber and including a flexible conduit extending between an inlet orifice in the inner surface to an outlet orifice in an outer surface of the flexible jetting nozzle. The flexible jetting nozzle may include (e.g., partially or completely comprise) a flexible material which may be distinguished from more rigid materials comprising the housing based on having a significantly smaller Young's Modulus (e.g., about 10% or less) than the Young's Modulus of the one or more rigid materials. As a result of including such flexible material, the flexible jetting nozzle may be configured to deform (e.g., be at least partially compressed) to cause a cross-sectional flow area of the flexible conduit, which may be the smallest cross-sectional flow area of the flexible conduit, to dilate ("widen") in response to an increase of the internal pressure of the viscous medium in the jetting chamber and to contract ("shrink") in response to a decrease of the internal pressure of the viscous medium in the jetting chamber. In some example embodiments, the flexible material may be the same material as the rigid material, and the flexible jetting nozzle may include a thin layer of the material that is the same as the rigid material, where the thickness of the material of the flexible jetting nozzle is substantially less than the thickness of the material comprising the housing (e.g., between about 0.1% thickness of the material of the housing to about 10% thickness of the material of the housing), such that the flexible jetting nozzle is configured to deform based on the relatively small thickness of the material of the flexible jetting nozzle.

Such a flexible jetting nozzle may be configured to have, in a non-deformed state (e.g., "rest state") a flexible conduit having a cross-sectional flow area (e.g., smallest cross-sectional flow area) that is smaller than the cross-sectional flow areas of jetting nozzles that are entirely comprised of rigid materials (e.g., steel). The flexible jetting nozzle may deform under increased jetting chamber internal pressure to increase (e.g., dilate) the cross-sectional flow area to enable viscous medium flow through the flexible conduit, and thus droplet formation. The flexible jetting nozzle may relax, under reduced jetting chamber internal pressure to decrease (e.g., contract) the cross-sectional flow area, which may provide a pinching mechanism to limit the amount of fluid that enters the flexible conduit and therefore decrease the length of filament formation, thereby inducing droplet break-off from the remainder viscous medium in the jetting device.

Because such droplet formation and break-off is at least partially mechanically controlled by the dilation and contraction of the flexible conduit cross-sectional flow area in response to variation of internal pressure in the jetting chamber, the droplet break-off may be more controllable and thus the droplets jetted by the jetting device may be more consistent in volume, shape, and/or velocity. In addition, based on at least partially inducing droplet break-off due to relaxation of the flexible jetting nozzle to contract the cross-sectional flow area of the flexible conduit, so as to force a more distinct, consistent droplet break-off point, the flexible jetting nozzle may enable reduction or prevention of droplet satellite formation during droplet jetting operations. As a result of the above, the reliability and quality of workpieces formed by the jetting device may be improved.

In some example embodiments, the variable cross-sectional flow area of the flexible jetting nozzle may enable the flexible jetting nozzle to have variable hydrodynamic resistance. For example, in response to an increase in internal pressure of viscous medium in the jetting chamber, the flexible jetting nozzle may be deformed to reduce the hydrodynamic resistance of the jetting nozzle, based on a cross-sectional flow area (e.g., smallest cross-sectional flow area) of the flexible conduit being increased as a result of the deformation, such that viscous medium flow through the flexible conduit to form a droplet may be enabled. In another example, in response to a decrease in internal pressure of viscous medium in the jetting chamber, the flexible jetting nozzle may be relaxed from the deformed state to increase the hydrodynamic resistance of the jetting nozzle, based on a cross-sectional flow area (e.g., smallest cross-sectional flow area) of the flexible conduit being decreased as a result of the relaxation, such that viscous medium flow through the flexible conduit may be limited, thereby inducing more controllable, consistent droplet break-off.

In some example embodiments, the flexible jetting nozzle may be configured to provide improved agglomerate transport capability, based on being adjustably deformable in response to jetting chamber internal pressure variation. The viscous medium held in the jetting chamber of the jetting device may include agglomerates and/or various large particles, where agglomerates may include collections of particles in the viscous medium that are held together through adhesive forces but can be separated through the application of moderate force, and where large particles may include individual bodies of a specific material. Based on being deformable, the flexible jetting nozzle may be configured to enable transport of the agglomerates and/or large particles through the flexible conduit during jetting operations, thereby reducing the vulnerability of the jetting device to clogging by said agglomerates and/or large particles and thus improving reliability and performance of the jetting device.

FIG. 1 is a perspective view illustrating a jetting device 1 according to some example embodiments of the technology disclosed herein.

The jetting device 1 may be configured to dispense ("jet") one or more droplets of a viscous medium onto a substrate (e.g., board 2, which may be a "workpiece") to generate ("establish," "form," "provide," etc.) a board 2 having one or more deposits therein. The above "dispensing" process performed by the jetting device 1 may be referred to as "jetting."

For ease of description, the viscous medium may hereinafter be referred to as solder paste, which is one of the alternatives defined above. For the same reason, the substrate may be referred to herein as an electric circuit board and the gas may be referred to herein as air.

In some example embodiments, including the example embodiments illustrated in FIG. 1, the jetting device 1 includes an X-beam 3 and an X-wagon 4. The X-wagon 4 may be connected to the X-beam 3 via an X-rail 16 and may be reciprocatingly movable (e.g., configured to be moved reciprocatingly) along the X-rail 16. The X-beam 3 may be reciprocatingly movably connected to a Y-rail 17, the X-beam 3 thereby being movable (e.g., configured to be moved) perpendicularly to the X-rail 16. The Y-rail 17 may be rigidly mounted in the jetting device 1. Generally, the above-described movable elements may be configured to be moved based on operation of one or more linear motors (not shown) that may be included in the jetting device 1.

In some example embodiments, including the example embodiments illustrated in FIG. 1, the jetting device 1 includes a conveyor 18 configured to carry the board 2 through the jetting device 1, and a locking device 19 for locking the board 2 when jetting is to take place.

A docking device 8 (not visible in FIG. 1, shown in FIG. 2) may be connected to the X-wagon 4 to enable releasable mounting of a jetting head assembly 5 at the docking device 8. The jetting head assembly 5 may be arranged for dispensing droplets of solder paste, i.e. jetting, which impact and form deposits on the board 2. The jetting device 1 also may include a vision device. In some example embodiments, including the example embodiments illustrated in FIG. 1, the vision device is a camera 7. The camera 7 may be used by a control device (not shown in FIG. 1) of the jetting device 1 to determine the position and/or rotation of the board 2 and/or to check the result of the dispensing process by viewing the deposits on the board 2.

Figure 2:
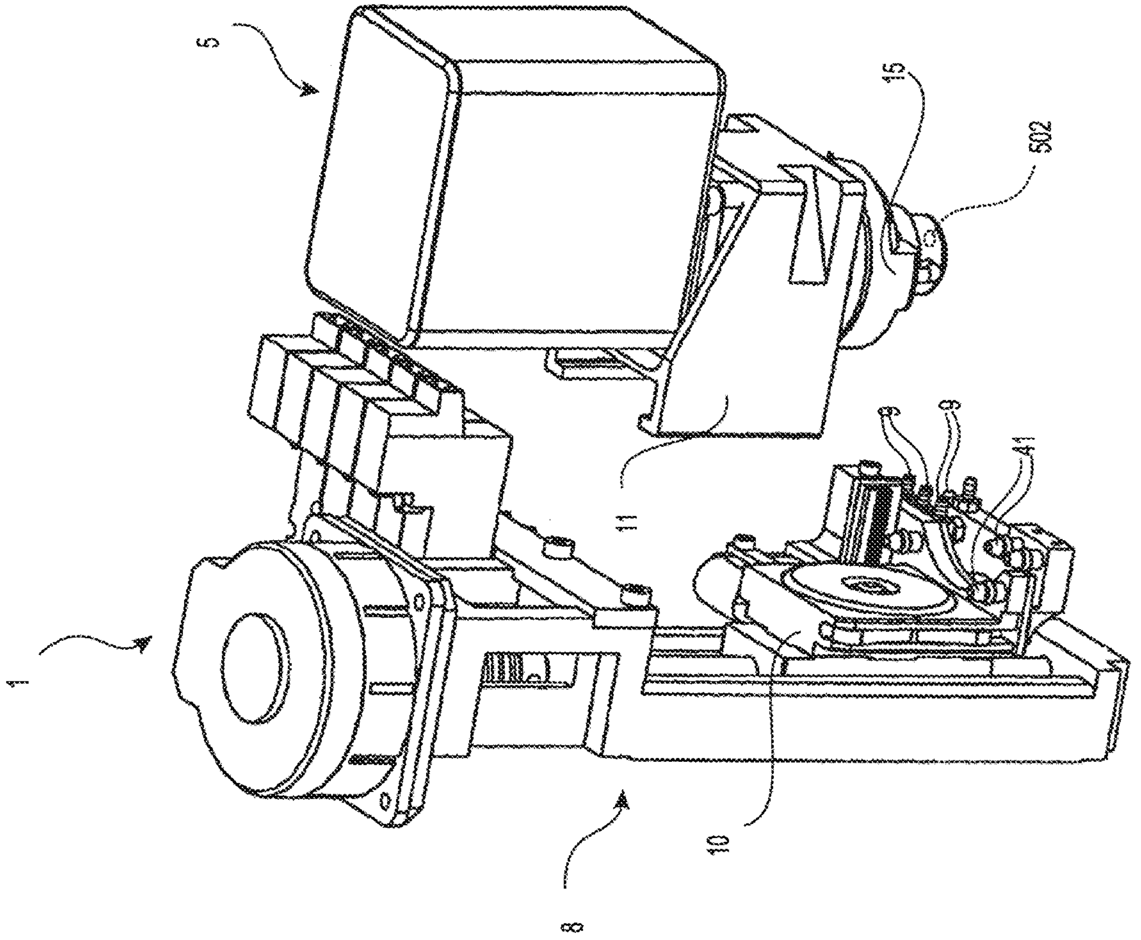
FIG. 2 is a perspective view of a jetting device according to some example embodiments of the technology disclosed herein.

In some example embodiments, including the example embodiments illustrated in FIG. 1, the jetting device 1 includes a flow generator 6. In some example embodiments, including the example embodiments illustrated in FIG. 1, the flow generator 6 is a source of compressed air (e.g., a compressed air tank, a compressor, or the like). The flow generator 6 may be in communication with the docking device 8 via an air conduit interface which may be connectable to a complementary air conduit interface. In some example embodiments, the air conduit interface may include inlet nipples 9 of the docking device 8, as shown in FIG. 2.

As understood by those skilled in the art, the jetting device 1 may include a control device (not explicitly shown in FIG. 1) configured to execute software running the jetting device 1. Such a control device may include a memory storing a program of instructions thereon and a processor configured to execute the program of instructions to operate and/or control one or more portions of the jetting device 1 to perform a "jetting" operation.

In some example embodiments, the jetting device 1 may be configured to operate as follows. The board 2 may be fed into the jetting device 1 via the conveyor 18, upon which the board 2 may be placed. If and/or when the board 2 is in a particular position under the X-wagon 4, the board 2 may be fixed with the aid of the locking device 19. By means of the camera 7, fiducial markers may be located, which markers are prearranged on the surface of the board 2 and used to determine the precise position thereof. Then, by moving the X-wagon over the board 2 according to a particular (or, alternatively, predetermined, pre-programmed, etc.) pattern and operating the jetting head assembly 5 at predetermined locations, solder paste is applied on the board 2 at the desired locations. Such an operation may be at least partially implemented by the control device that controls one or more portions of the jetting device 1 (e.g., locating the fiducial markers via processing images captured by the camera 7, controlling a motor to cause the X-wagon to be moved over the board 2 according to a particular pattern, operating the jetting head assembly 5, etc.).

It will be understood that a jetting device 1 according to some example embodiments may include different combinations of the elements shown in FIG. 1 and may omit some or all elements beyond the jetting head assembly 5 shown in FIG. 1. In some example embodiments, the jetting device 1 may be limited to the jetting head assembly 5. It will be understood that the jetting device shown in FIG. 1 may include a flexible jetting nozzle 502 as described herein and thus may be configured to jet one or more droplets wherein the flexible jetting nozzle 502 of the jetting device 1 may be deformed to change a cross-sectional flow area of a portion of a flexible conduit 504 of the flexible jetting nozzle 502 in response to an increase in internal pressure of viscous medium in a jetting chamber of the jetting device 1, as described herein.

Figure 3:
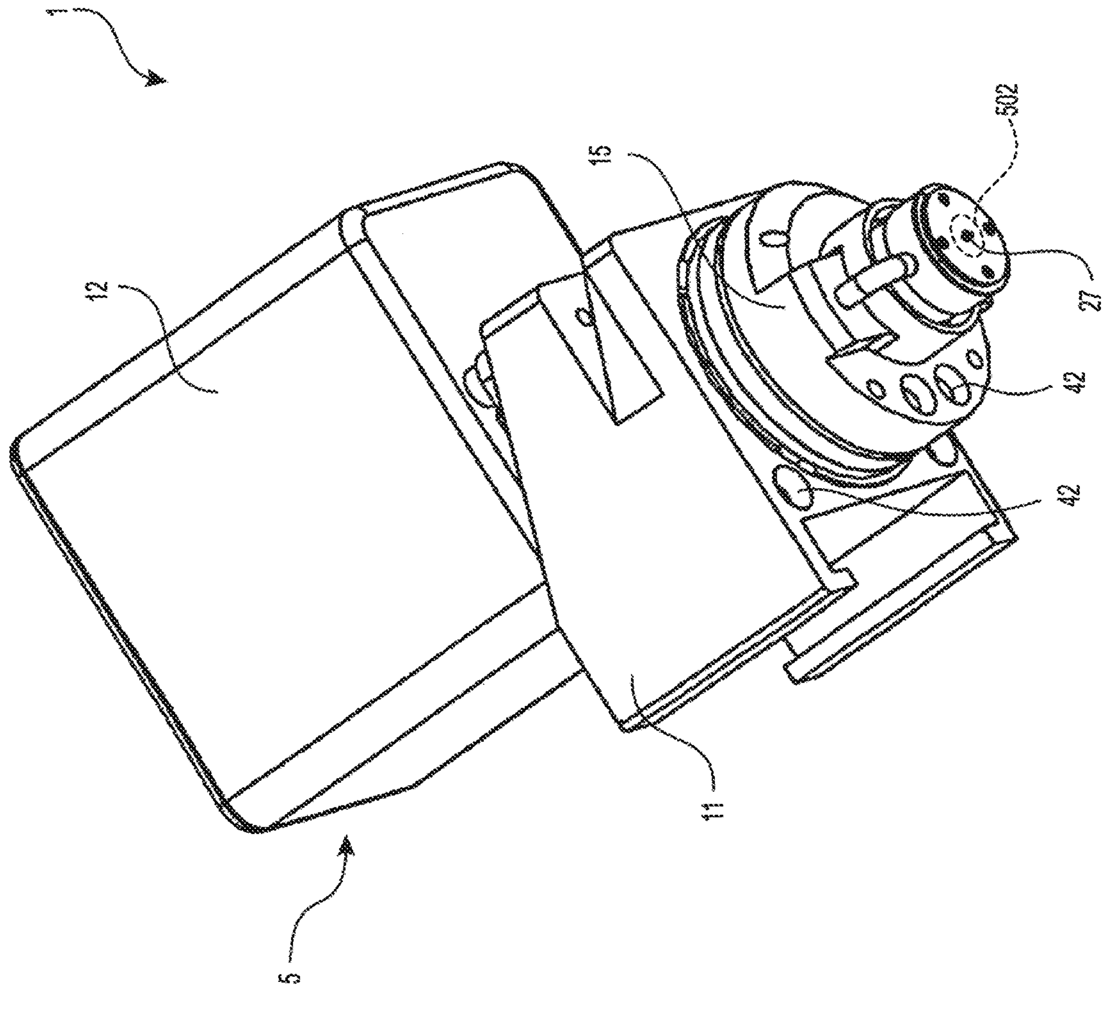
FIG. 3 is a schematic view illustrating a jetting device according to some example embodiments of the technology disclosed herein.

FIG. 2 is a schematic view illustrating a jetting device 1 including a docking device 8 and a jetting head assembly 5 according to some example embodiments of the technology disclosed herein. FIG. 3 is a schematic view illustrating a jetting head assembly 5 according to some example embodiments of the technology disclosed herein. The docking device 8 and jetting head assembly 5 may be included in one or more example embodiments of a jetting device 1, including the jetting device 1 illustrated in FIG. 1.

Referring to FIGS. 2 and 3, the jetting head assembly 5 may include an assembly holder 11, which is configured to connect the jetting head assembly 5 to an assembly support 10 of the docking device 8. The jetting head assembly 5 may include an assembly housing 15. The jetting head assembly 5 may include a supply container 12 configured to provide a supply of viscous medium.

The jetting head assembly 5 may be configured to be connected to a flow generator 6 via a pneumatic interface having inlets 42 positioned to interface in airtight engagement with a complementary pneumatic interface having outlets 41 of the docking device 8. The outlets 41 are connected to inlet nipples 9, which may be coupled to the flow generator 6, via internal conduits of the docking device 8.

The jetting head assembly 5 may be configured to: shoot different types/classes of solder pastes; shoot droplets with different shot sizes/ranges (e.g., overlapping or non-overlapping ranges) and/or shoot droplets of various types of viscous media (solder paste, glue, etc.). Additionally, the jetting head assembly 5 may be used for add-on jetting and/or repair.

It will be understood that, in some example embodiments, a jetting device 1 may be limited to the jetting head assembly 5, for example being limited to the jetting head assembly 5 shown in FIG. 3 and excluding the other portions of the jetting device 1 shown in FIGS. 1-2. It will further be understood that, in some example embodiments, a jetting device 1 may be limited to a limited portion of the jetting head assembly 5, for example some or all of the assembly housing 15 of the jetting head assembly 5. It will be understood that the jetting head assembly shown in FIG. 2 may include a flexible jetting nozzle 502 as described herein and thus may be configured to jet one or more droplets wherein the flexible jetting nozzle 502 of the jetting head assembly 5 may be deformed to change a cross-sectional flow area of a portion of a flexible conduit 504 of the flexible jetting nozzle 502 in response to an increase in internal pressure of viscous medium in a jetting chamber of the jetting head assembly 5, as described herein.

Figure 4:
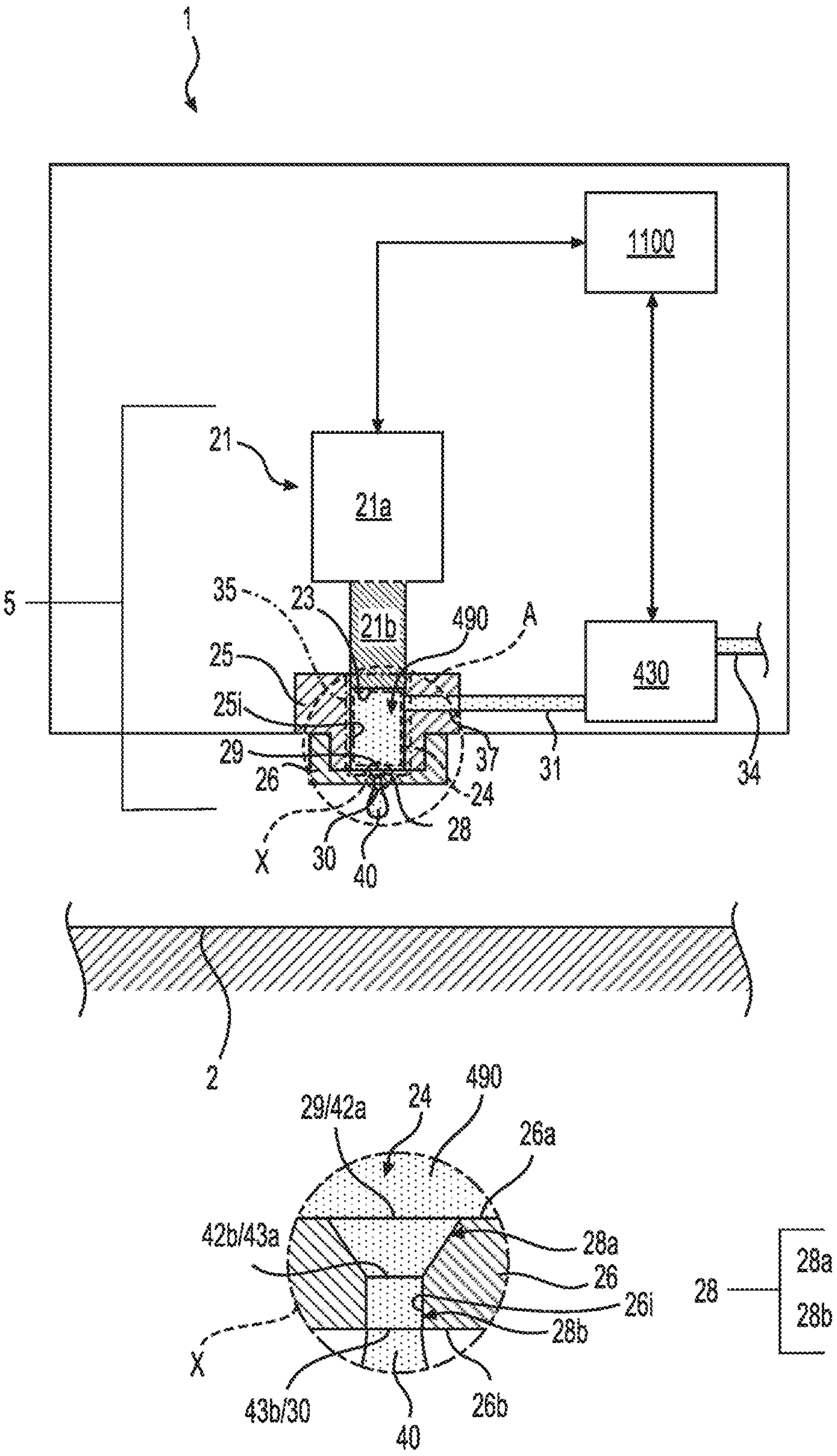
FIG. 4 is a sectional view of a portion of a jetting device according to some example embodiments of the technology disclosed herein.

FIG. 4 is a sectional view of a portion of a jetting device 1 according to some example embodiments of the technology disclosed herein, and further includes an expanded view of the portion of the jetting device included in region X shown in FIG. 4. The jetting head assembly 5 shown in FIG. 4 may be included in one or more example embodiments of a jetting device 1, including the jetting device 1 illustrated in FIG. 1.

With reference now to FIG. 4, the contents and function of the device enclosed in the jetting head assembly 5 of the jetting device 1 will be explained in greater detail. It will be understood that, in some example embodiments, the jetting device 1 may include some or all of the elements of the jetting head assembly 5, including some or all of the elements of the assembly housing 15.

In some example embodiments, including the example embodiments illustrated in FIG. 4, the jetting head assembly 5, and thus the jetting device 1, may include an impacting device 21. In some example embodiments, including the example embodiments illustrated in FIG. 4, the impacting device 21 may include a piezoelectric actuator having a number ("quantity") of relatively thin, piezoelectric elements stacked together to form an actuator part 21*a* that is a piezoelectric actuator part. As shown in FIG. 4, an upper end of the actuator part 21*a* may be rigidly (e.g., fixedly) connected to the assembly housing 15. The jetting head assembly 5 may further include a bushing 25 (also referred to herein as a "housing") rigidly connected to the assembly housing 15. The impacting device 21 may further include a plunger 21*b*, which is rigidly connected to a lower end of the actuator part 21*a* and is axially movable, along axis 401, while slidably extending (e.g., "moving") through a piston bore 35 in the bushing 25. It will be understood that the piston bore 35 may be referred to as a space (e.g., a fixed-volume space) defined by one or more inner surfaces 25*i* of the bushing 25. It will thus be understood that, based on being configured to move through the piston bore 35 in the bushing 25, the impacting device 21 is configured to move through at least a portion of a space (e.g., a fixed-volume space) defined by one or more inner surfaces 25*i* of the bushing 25. Cup springs (not shown) may be included in the jetting head assembly 5 to resiliently balance the plunger 21*b* against the assembly housing 15, and to provide a preload for the actuator part 21*a*.

While the example embodiments shown in FIG. 4 illustrate the impacting device 21 as being a piezoelectric actuator, such that the actuator part 21*a* is a piezoelectric actuator part, it will be understood that example embodiments are not limited thereto, and the impacting device 21 may be any device configured to implement controllable, repeatable, and precise reciprocating movements through the piston bore 35, such that the actuator part 21*a* may be any such known actuator configured to implement such movement. For example, in some example embodiments, the impacting device 21 may be a reciprocating lever arm connected to plunger 21*b*, a pneumatic actuator device, a combination of one or more piezoelectric and/or pneumatic actuator devices with a fulcrum configuration, any combination thereof, or the like.

In some example embodiments, the jetting device 1 includes a control device 1000. The control device 1000 may be configured (e.g., via programming and being electrically connected to the impacting device 21) to apply a drive voltage intermittently to the impacting device 21, thereby causing an intermittent extension of the impacting device and hence a reciprocating movement of the plunger 21*b* with respect to the assembly housing 15, in accordance with a jetting program, for example where the impacting device 21 includes a piezoelectric actuator and the actuator part 21*a* extends (e.g., moves) and causes the plunger 21*b* to move based on the applied drive voltage. Such data may be stored in a memory included in the control device 1000. The drive voltage may be described further herein as including and/or being included in a "control signal," including an "actuator control signal." It will be understood that an extension of a device into or through a space, including the extension of any part of the impacting device 21 into or through a space as described herein, may be referred to herein as the device as a whole (e.g., the impacting device 21) "moving" through said space.

In some example embodiments, including the example embodiments illustrated in FIG. 4, the jetting device 1 includes a jetting nozzle 26 configured to be operatively directed against (e.g., facing) the board 2, onto which one or more droplets 40 of viscous medium may be jetted. The jetting nozzle 26 may include a conduit 28 that extends through an entire interior (e.g., "thickness") of the jetting nozzle, from an inlet orifice 29 in inner surface 26*a* that at least partially defines the jetting chamber 24, to an outlet orifice 30 (also referred to herein as a "outlet orifice") in an outer surface 26*b* that faces outwards from the assembly housing 15, through which the droplets 40 may be jetted.

In some example embodiments, the plunger 21*b* comprises a piston which is configured to be slidably and axially movably extended, along axis 401, through a piston bore 35, and an end surface ("impact end surface 23") of said piston portion of the plunger 21*b* may be arranged close to said jetting nozzle 26 as a result of said extension/movement.

As shown in FIG. 4, a portion of the piston bore 35 may be a jetting chamber 24, where the jetting chamber 24 is defined by the shape of the impact end surface 23 of said plunger 21*b*, one or more inner surfaces 25*i* of the bushing 25, and the jetting nozzle 26 (e.g., by at least some of the inner surfaces 26*a*. In some example embodiments, the jetting chamber 24 may be defined as a limited portion of the piston bore 35 (e.g., the space defined by the one or more inner surfaces 25*i* of the bushing 25) that is not occupied by the impacting device 21.

As shown in FIG. 4, the jetting conduit 28 is defined by one or more inner surfaces 26*i* of the jetting nozzle and may have a volumetric shape approximating that of a combination of at least a truncated conical space and a cylindrical space and may include an upper, conical conduit 28*a*, that extends from an inlet orifice 42*a* that is the inlet orifice 29 in the inner surface 26*a* to a smaller outlet orifice 42*b*, and a lower, cylindrical conduit 28*b* that includes an inlet orifice 43*a* that is open to the outlet orifice 42*b* and extends to an outlet orifice 43*b* that is the outlet orifice 30 in the outer surface 26*b*. In the example embodiments shown in FIG. 4, orifices 42*b* and 43*a* are the same orifice, but example embodiments are not limited thereto, and, in some example embodiments orifices, 42*b* and 43*a* may be separate orifices that are spaced apart from each other by an interposing conduit.

As shown in FIG. 4, the cylindrical conduit 28*b* may have a smaller diameter, and thus a smaller cross-sectional flow area, than some or all diameters of the conical conduit 28*a*. It will be understood that, in some example embodiments, the conduit 28 may omit the conical conduit 28*a* and may be entirely a cylindrical conduit 28*b*, or the conduit 28 may omit the cylindrical conduit 28*b* and may be entirely a conical conduit 28*a*. It will also be understood that the jetting conduit 28 may have any shape, defined by one or more inner surfaces 26*i* of the jetting nozzle 26, that defines a conduit between the jetting chamber 24 and the outlet orifice 30.

Axial movement of the plunger 21*b* towards the jetting nozzle 26, said movement being caused by the intermittent extension of the actuator part 21*a* (e.g., piezoelectric actuator part), said movement involving the plunger 21*b* being received at least partially or entirely into the volume of the piston bore 35, may cause a rapid decrease in the volume of the jetting chamber 24 and thus a rapid pressurization (e.g., increase in internal pressure), and jetting through the outlet orifice 30, of any viscous medium located in the jetting chamber 24 and/or in the conduit 28, including the movement of any viscous medium contained in the jetting chamber 24 out of the jetting chamber 24 and through the conduit 28 to the outlet orifice 30.

Viscous medium may be supplied to the jetting chamber 24 from the supply container 12, see FIG. 2, via a feeding device. The feeding device may be referred to herein as a viscous medium supply 430. The feeding device may be configured to induce a flow of viscous medium (e.g., "solder paste") through one or more conduits to the jetting nozzle 26. The feeding device may include a motor (which is not shown and may be an electric motor) having a motor shaft partly provided in a tubular bore, which extends through the assembly housing 15 to an outlet communicating via a conduit 31 with the piston bore 35. An end portion of the motor shaft may form a rotatable feed screw which is provided in, and coaxial with, the tubular bore. A portion of the rotatable feed screw may be surrounded by an array of resilient, elastomeric a-rings arranged coaxially therewith in the tubular bore, the threads of the rotatable feed screw making sliding contact with the innermost surface of the a-rings.

The pressurized air obtained at the jetting head assembly 5 from the above-mentioned source of pressurized air (e.g., flow generator 6) may be used by the jetting head assembly 5 to apply a pressure on the viscous medium contained in the supply container 12, thereby feeding said viscous medium to an inlet port 34 communicating with the viscous medium supply 430.

An electronic control signal provided by the control device 1000 of the jetting device 1 to the motor of the feeding device of the viscous medium supply 430 may cause the motor shaft, and thus the rotatable feed screw, to rotate a desired angle, or at a desired rotational speed. Solder paste captured between the threads of the rotatable feed screw and the inner surface of the a-rings may then be caused to travel from the inlet port 34 to the piston bore 35 via the outlet port and the conduit 31, in accordance with the rotational movement of the motor shaft. A sealing a-ring may be provided at the top of the piston bore 35 and the bushing 25, such that any viscous medium fed towards the piston bore 35 is prevented from escaping from the piston bore 35 and possibly disturbing the action of the plunger 21*b*.

The viscous medium may then be fed into the jetting chamber 24 via the conduit 31 and a channel 37. As shown in FIG. 4, the channel 37 may extend through the bushing 25 to the jetting chamber 24 through a sidewall of the jetting chamber 24 (e.g., an inner surface 25*i* of the bushing 25 that at least partially defines the piston bore 35 and thus at least partially defines the jetting chamber 24).

As described further below, in some example embodiments, the jetting device 1 is configured to provide improved control of the formation and break-off of one or more droplets from the jetting nozzle 26, for example based on at least a portion of the jetting nozzle 26 being flexible so as to be configured to deform and thus change a cross-sectional flow area (e.g., smallest cross-sectional flow area) of the conduit 28 during a jetting operation in response to variation of internal pressure of viscous medium in the jetting chamber 24. Such an improved control may include providing improved control of the break-off of a filament connecting a droplet to the nozzle based on providing improve spatial and temporal filament break-off localization. As a result, the jetting device 1 may be configured to provide improved uniformity (and/or reduced unintentional variation) of droplets jetted by the jetting device on a substrate and/or reduced satellite droplet formation. Thus, the jetting device may be configured to provide workpieces having deposits thereon that have improved uniformity and reduced variation and unintended satellite deposits, thereby providing workpieces associated with improved performance and/or reliability.

While the example embodiments shown in FIG. 4 and FIGS. 5A, 6A, 7A illustrate the impacting device 21 as including a plunger 21*b* having an impact end surface 23 that defines a portion of the jetting chamber 24, and that the plunger 21*b* moves through the piston bore 35 to reduce the volume of the jetting chamber 24, it will be understood that example embodiments of the jetting head assembly 5 are not limited thereto. It will be understood that the impacting device includes a device that may move, and an impact end surface that defines a portion of the jetting chamber 24 and is configured to move through a space to reduce or increase a volume of the jetting chamber 24, but the impact end surface may be a surface of a piece of material that is at least partially fixed in place and moves based on a portion of the piece of material being deformed through space while at least edge portions of the piece of material are fixed to the housing and maintain a sealing of the jetting chamber 24 from movable pieces of the impacting device 21 that are isolated from the jetting chamber 24 by the piece of material, where the piece of material is understood to be a part of the impacting device.

Figure 12:
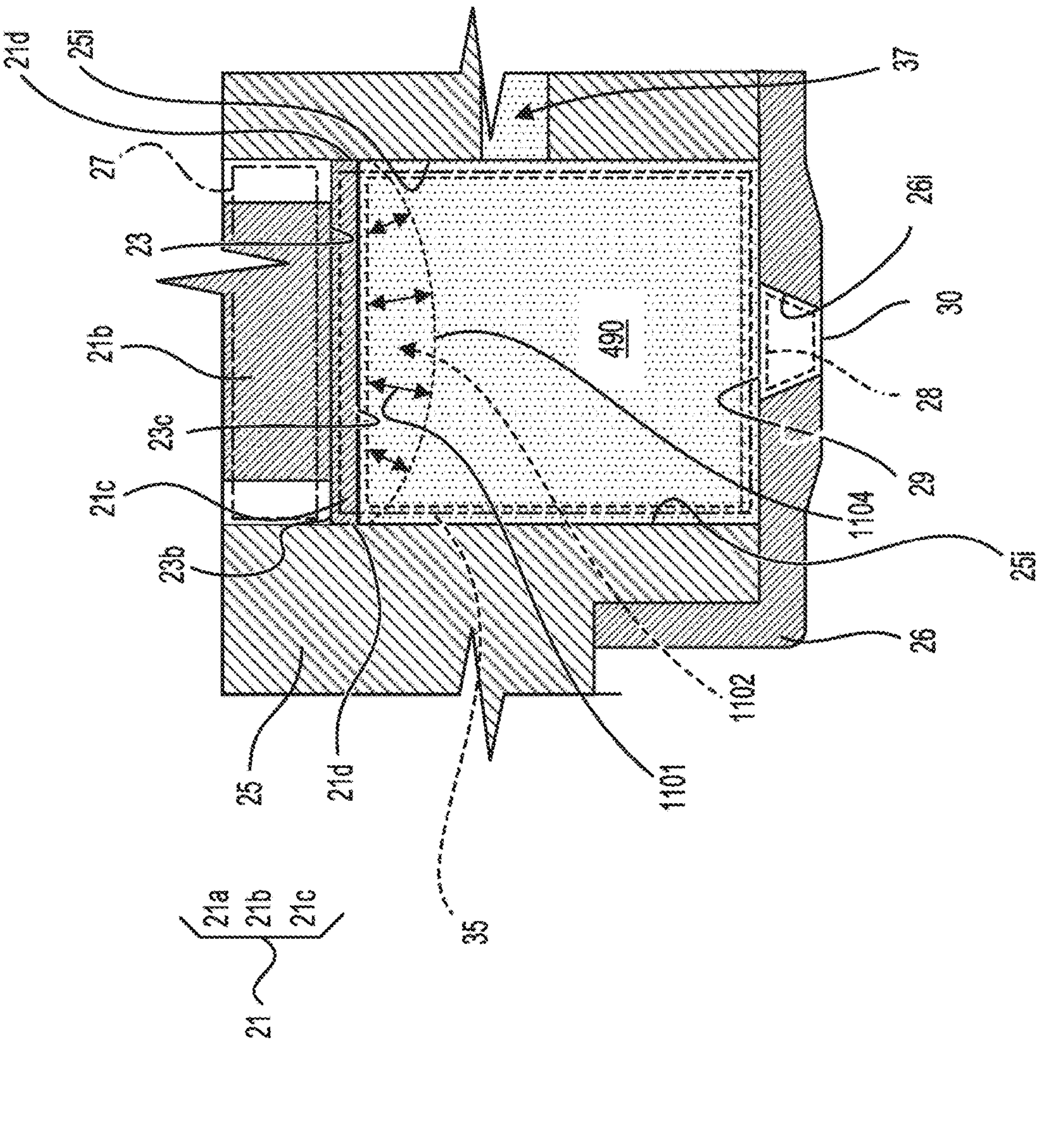
FIG. 12 is a sectional view of a portion of a jetting device according to some example embodiments of the technology disclosed herein.

For example, FIG. 12 is a sectional view of a portion of a jetting device according to some example embodiments of the technology disclosed herein, wherein the impacting device 21 includes at least an actuator part 21*a* and a plunger 21*b* as described herein with reference to FIGS. 4-9 and further includes a membrane 21*c* that includes a flexible material (which may be similar to or different than the flexible material of the flexible jetting nozzle 502 as described herein), where the membrane 21*c* includes an impact end surface 23*c* that defines the upper boundary of the jetting chamber 24, and the impact end surface 23 of the plunger 21*b* is in contact with an upper surface 23*b* of the membrane 21*c*, such that the plunger 21*b* is isolated from the jetting chamber 24 by the membrane 21*c*.

While FIG. 12 illustrates the impacting device 21 as including the plunger 21*b*, it will be understood that in some example embodiments the plunger 21*b* may be absent, such that the actuator part 21*a* is in direct contact with the upper surface 23*b* of the membrane 21*c* and the impact end surface 23 is a lower surface of the actuator part 21*a* that is in contact with the upper surface 23*b*, such that the actuator part 21*a* may act directly on the membrane 21*c*. As shown in FIG. 12, the portions of the impacting device 21 that include the actuator part 21*a* and may further include the plunger 21*b* are located within a separate space 27, isolated from the jetting chamber 24 by membrane 21*c*, where the separate space 27 is at least partially defined by one or more separate inner surfaces 25*i* of the bushing and the upper surface 23*b* of the membrane 21*c*. As shown, the plunger 21*b* and/or actuator part 21*a* may have a smaller diameter than the diameter of the space 27, but example embodiments are not limited thereto. As further shown, the piston bore 35 may include at least the space, defined by the bushing inner surfaces 25*i*, in which at least the membrane 21*c* is located, and may further include the space 27 in which the plunger 21*b* and/or actuator part 21*a* are located, but example embodiments are not limited thereto.

The jetting head assembly 5 shown in FIG. 12 may operate similarly to the jetting head assembly shown in FIGS. 5A-8C and FIG. 9, where the impacting device 21 causes a volume of the jetting chamber 24 to be reduced to force one or more droplets 410 of the viscous medium 490 in the jetting chamber 24 through the conduit 28 of the jetting nozzle 26 to be jetted as the one or more droplets 410. Additionally, the jetting nozzle 26 as shown in FIG. 12 may include any of the example embodiments of jetting nozzles 26 and thus may include any of the example embodiments of flexible jetting nozzles 502 and may operate the same way as described with reference to any example embodiments herein.

As shown in FIG. 12, one or more surfaces 21*d* of the membrane 21*c* are fixed to one or more corresponding inner surfaces 25*i* of the bushing 25, via any well-known means for fixing a flexible material to a rigid material (e.g., clamping, adhesive, sintering, friction fit, or the like), such that said one or more surfaces 21*d* of the membrane 21*c* are held in place and do not move during a jetting operation.

Figure 8A:
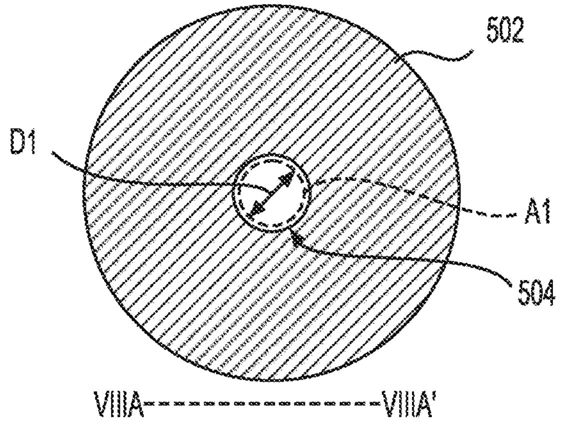
FIG. 8A is an expanded cross-sectional view of the jetting device of FIGS. 5A, 6A, and 7A along cross-sectional view lines VIIIA-VIIIA'.
Figure 8B:
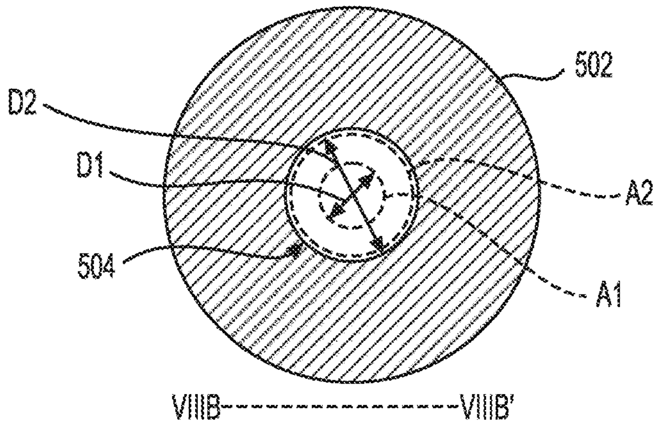
FIG. 8B is an expanded cross-sectional view of the jetting device of FIGS. 5B, 6B, and 7B along cross-sectional view lines VIIIB-VIIIB'.
Figure 8C:
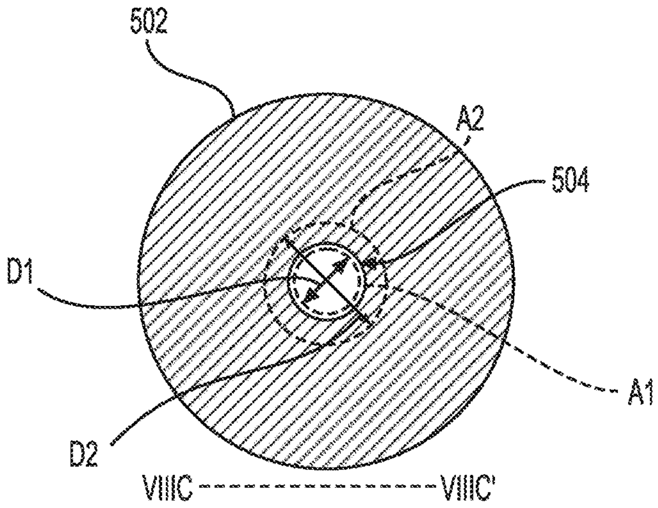
FIG. 8C is an expanded cross-sectional view of the jetting device of FIGS. 5C, 6C, and 7C along cross-sectional view lines VIIIC-VIIIC'.
Figure 9:
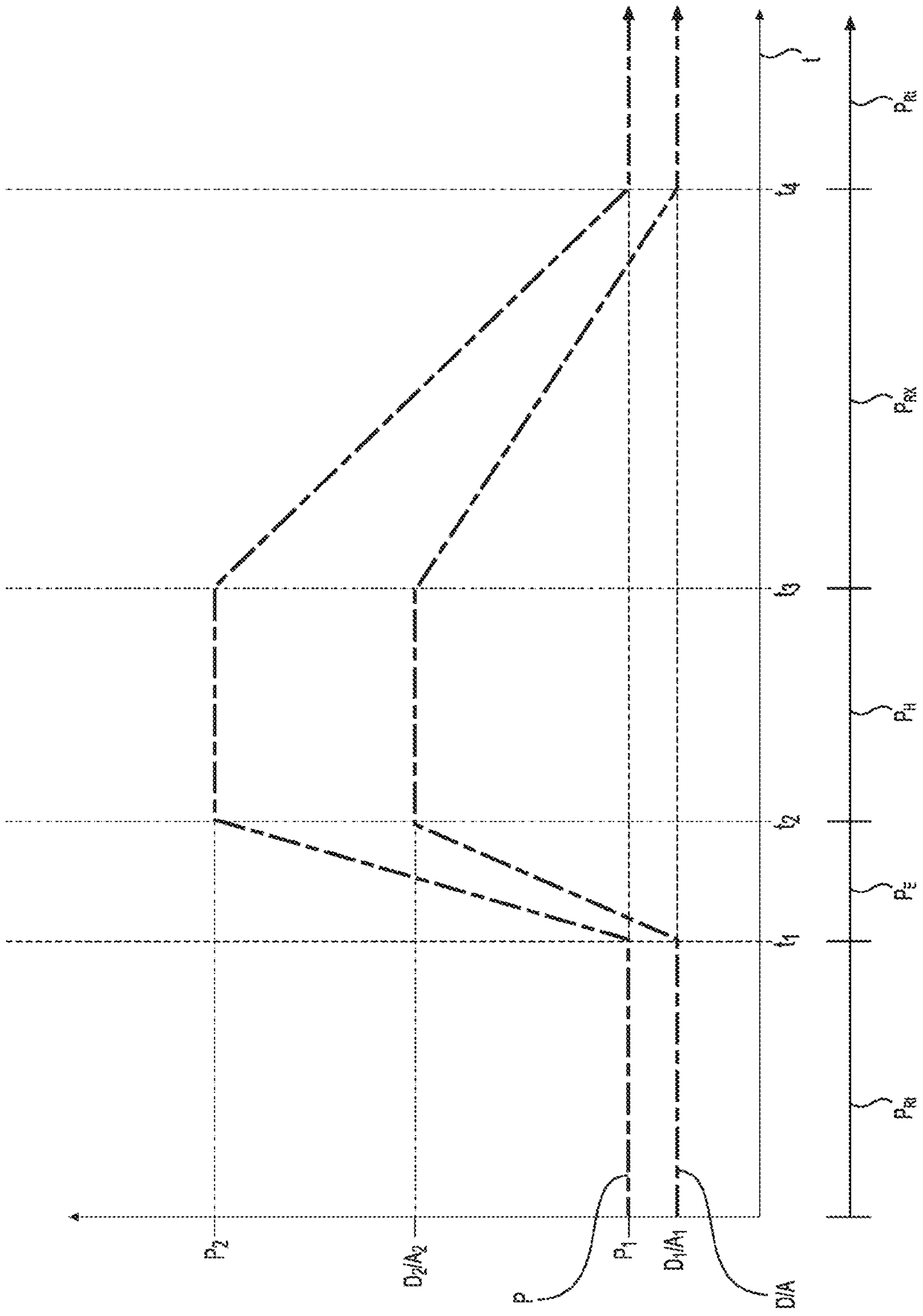
FIG. 9 is a timing chart illustrating variation of internal pressure and of the jetting chamber and applied voltage to the impacting device of the jetting device during a jetting operation according to some example embodiments of the technology disclosed herein.

During a jetting operation via the impacting device 21 shown in FIG. 12, at least the actuator part 21*a* may cause the impact end surface 23 contacting the upper surface 23*b* to move downwards, towards the jetting nozzle 26, thereby pushing the membrane 21*c* (which includes a flexible material) to be deformed 1101 (e.g., "pushed") downwards towards the jetting nozzle 26, such that the membrane 21*c* moves through a portion of space 1102 within the space defined by the one or more inner surfaces 25*i* of the bushing 25, so that the impact end surface 23*c* moves through the portion of space 1102 to a jetting position 1104 (e.g., extended position) such that the volume of the jetting chamber 24 is reduced by the volume of the portion of space 1102 through which the membrane 21*c* is deformed. As shown, the surfaces 21*d* of the membrane 21*c* may remain fixed to one or more inner surfaces 25*i* during the operation. As a result of the membrane 21*c* moving through the portion of space 1102 to reduce the volume of the jetting chamber 24, the impacting device may force one or more droplets of viscous medium 490 through the conduit 28 of the jetting nozzle 26 to be jetted as one or more droplets 410. The above-described deforming 1101 of the membrane 21*c*, based on at least the actuator part 21*a* causing impact end surface 23 to push downwards on the upper surface 23*b* of the membrane 21*c*, may be performed as part of the operation performed from time $t_1$ to time $t_2$ in FIG. 9. The membrane 21*c* may be held in the deformed position (e.g., such that impact end surface 23*c* remains at position 1104) from time $t_2$ to time $t_3$ as shown in FIG. 9, and the membrane 21*c* may be caused to relax to the initial position shown in FIG. 12, based on at least the actuator part 21*a* causing the impact end surface 23 to move upwards and away from the jetting nozzle 26 to release pressure exerted on the upper surface 23*b* of the membrane 21*c*, as part of the operation performed from time $t_3$ to time $t_4$ in FIG. 8. As noted above, it will be understood that the jetting nozzle 26 shown in FIG. 12 may include a flexible jetting nozzle 502 that may operate in the same way as the flexible jetting nozzle 502 described with reference to FIGS. 5A-8C and FIG. 9.

With reference now to FIGS. 5A-5C, 6A-6C, 7A-7C, which each show a portion of the jetting head assembly 5 in region A shown in FIG. 4 according to some example embodiments and at different points in a jetting operation, and with further reference to FIG. 8, the contents and function of a jetting device 1 that includes a jetting nozzle 26 that is at least partially flexible will be explained in greater detail. It will be understood that, while some elements of the jetting head assembly 5 shown in FIG. 4 are not shown in FIGS. 5A-7C (e.g., channel 37), said elements may still be included in example embodiments of the jetting head assembly 5 that have a portion, shown in region A, that corresponds to any of FIGS. 5A-7C.

Figure 5A:
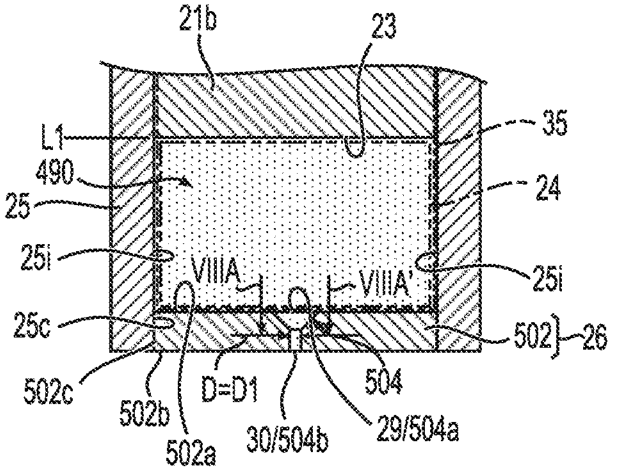
FIGS. 5A, 5B, and 5C are expanded cross-sectional views of region A of the jetting device shown in FIG. 4 at different configurations during a jetting operation according to some example embodiments of the technology disclosed herein.
Figure 5B:
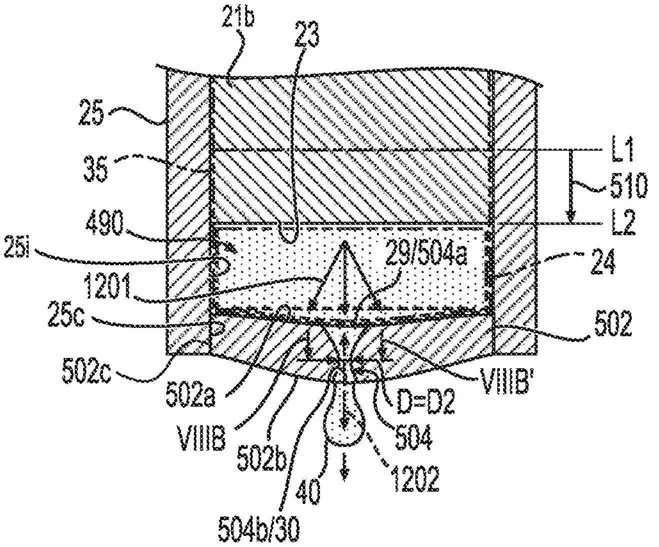
Figure 5C:
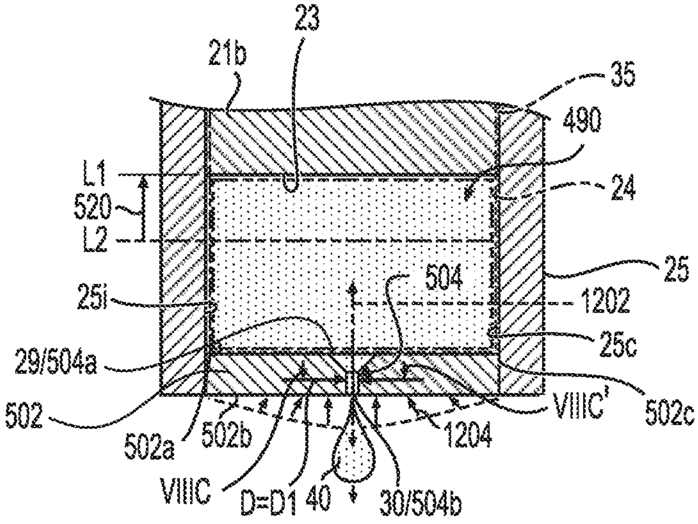
Figure 6A:
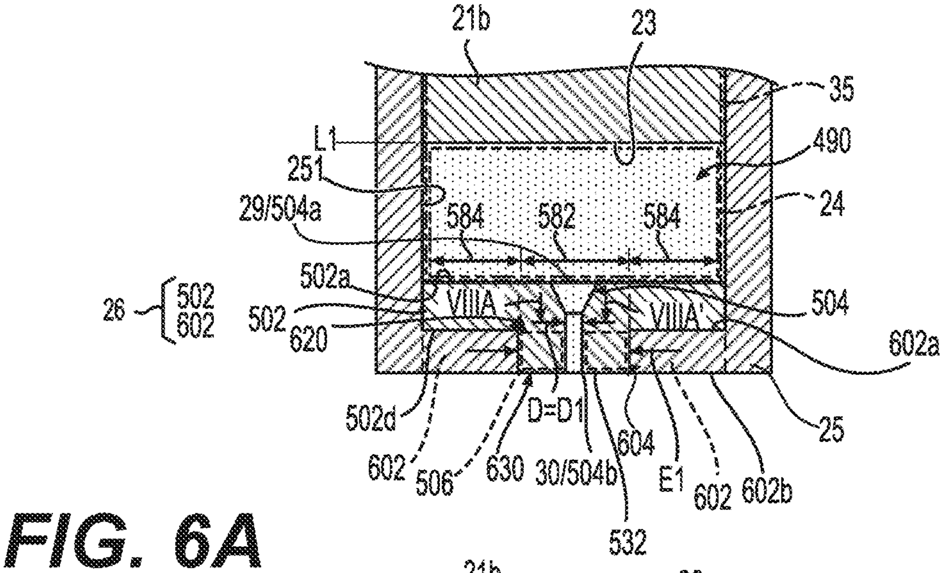
FIGS. 6A, 6B, and 6C are expanded cross-sectional views of region A of the jetting device shown in FIG. 4 at different configurations during a jetting operation according to some example embodiments of the technology disclosed herein.
Figure 6B:
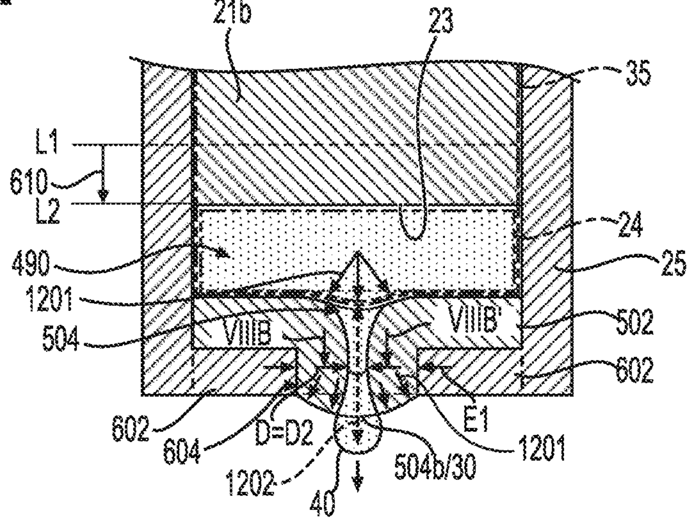
Figure 6C:
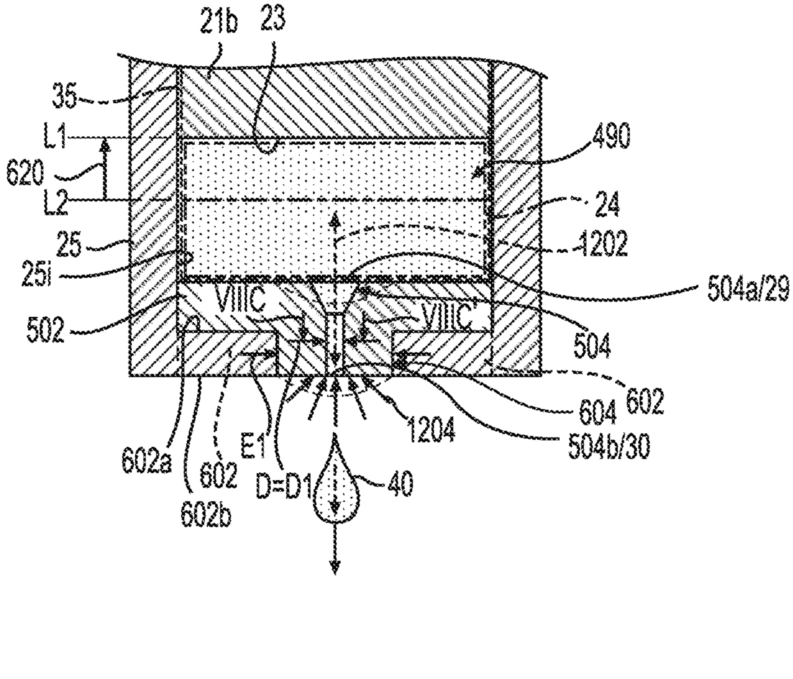
Figure 7A:
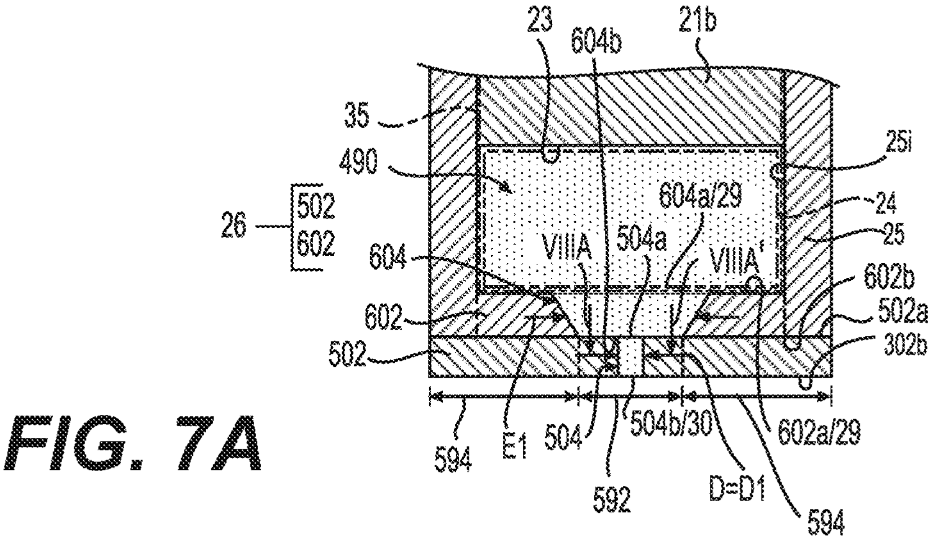
FIGS. 7A, 7B, and 7C are expanded cross-sectional views of region A of the jetting device shown in FIG. 4 at different configurations during a jetting operation according to some example embodiments of the technology disclosed herein.
Figure 7B:
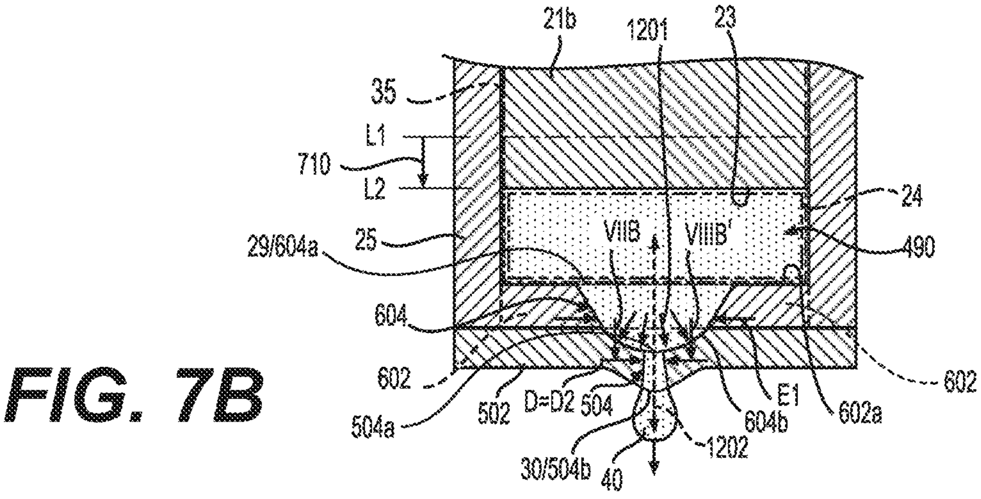
Figure 7C:
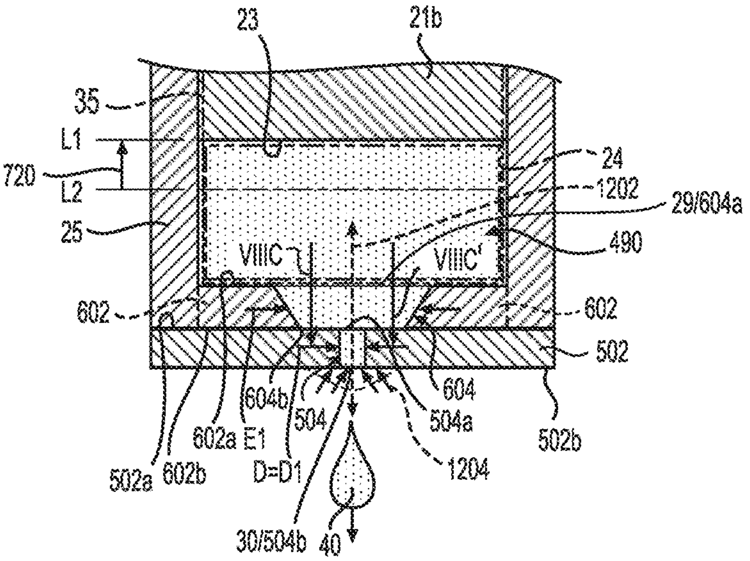

FIGS. 5A, 5B, and 5C are expanded cross-sectional views of region A of the jetting device shown in FIG. 4 at different configurations during a jetting operation according to some example embodiments of the technology disclosed herein. FIGS. 6A, 6B, and 6C are expanded cross-sectional views of region A of the jetting device shown in FIG. 4 at different configurations during a jetting operation according to some example embodiments of the technology disclosed herein. FIGS. 7A, 7B, and 7C are expanded cross-sectional views of region A of the jetting device shown in FIG. 4 at different configurations during a jetting operation according to some example embodiments of the technology disclosed herein. FIG. 8A is an expanded cross-sectional view of the jetting device of FIGS. 5A, 6A, and 7A along cross-sectional view lines VIIIA-VIIIA'. FIG. 8B is an expanded cross-sectional view of the jetting device of FIGS. 5B, 6B, and 7B along cross-sectional view lines VIIIB-VIIIB'. FIG. 8C is an expanded cross-sectional view of the jetting device of FIGS. 5C, 6C, and 7C along cross-sectional view lines VIIIC-VIIIC'. FIG. 9 is a timing chart illustrating variation of internal pressure and of the jetting chamber and applied voltage to the impacting device of the jetting device during a jetting operation according to some example embodiments of the technology disclosed herein. It will be understood that FIGS. 8A-8C illustrate views of a same portion (e.g., a same cross-section) of the flexible conduit 504 at different portions of a jetting operation.

Referring generally to FIGS. 5A-7C, in some example embodiments, the jetting nozzle 26 of FIG. 4 may include, in part or in entirety, a flexible jetting nozzle 502 that includes a flexible material, where the conduit 28 of the jetting nozzle 26 includes is a flexible conduit 504 extending through the flexible jetting nozzle, such that the flexible jetting nozzle 502 is configured to deform, from a rest state to a deformed state, to cause a cross-sectional flow area of at least a portion of the flexible conduit 504 (e.g., a smallest cross-sectional flow area of the flexible conduit 504) to dilate (e.g., from a first area A1 to a greater, second area A2) in response to an increase of the internal pressure of the viscous medium in the jetting chamber 24. The flexible jetting nozzle 502 may further be configured to relax, from the deformed state back to the rest state, to cause the cross-sectional flow area of the flexible conduit 504 to contract (e.g., from the second area A1 back to the smaller, first area A1) in response to a decrease of the internal pressure of the viscous medium in the jetting chamber. It will be understood that the "rest state" of the flexible jetting nozzle 502 may be a rest shape of the flexible jetting nozzle 502 that corresponds to an absence of viscous medium flow through the flexible conduit 504, for example when the control device 1100 of the jetting device 1 is not driving the impacting device 21 to reduce the volume of the jetting chamber 24.

As described herein, it will be understood that a "flexible material" of the flexible jetting nozzle 502 is a material that is configured to bend and/or deform without breaking. The flexibility of the flexible material comprising the flexible jetting nozzle 502 may be at least partially defined by a Young's Modulus, also referred to as a Modulus of Elasticity, which may be expressed herein in units of pressure of Gigapascals (GPa). For example, the flexible jetting nozzle 502 may at least partially comprise (or completely comprise) a flexible material having a Young's Modulus of about 0.001 to about 0.05 GPa. In another example, the flexible jetting nozzle 502 may at least partially comprise (or completely comprise) a flexible material having a Young's Modulus of about 0.1-1.0 GPa. In another example, the flexible jetting nozzle 502 may at least partially comprise (or completely comprise) a flexible material having a Young's Modulus of about 1.0 to about 3.0 GPa. In another example, the flexible jetting nozzle 502 may at least partially comprise (or completely comprise) a flexible material having a Young's Modulus of about 1.0 to about 5.0 GPa. In another example, the flexible jetting nozzle 502 may at least partially comprise (or completely comprise) a flexible material having a Young's Modulus of about 5.0 to about 11.0 GPa.

In some example embodiments, the flexible material at least partially comprising the flexible jetting nozzle 502 may include any type of flexible rubber and/or plastic material, including for example Silicone Rubber (having a Young's Modulus of about 0.001 GPa to about 0.05 GPa), low-density polyethylene (having a Young's Modulus of about 0.11 GPa to about 0.86 GPa), Polytetrafluoroethylene (PTFE) (having a Young's Modulus of about 0.5 GPa), High-density polyethylene (HDPE) (having a Young's Modulus of about 0.8 GPa), Polystyrene (having a Young's Modulus of about 3.0 GPa), Polypropylene (PP) (having a Young's Modulus of about 1.0 GPa), Polycarbonate (having a Young's Modulus of about 2.0 GPa to about 2.4 GPa), Polyethylene terephthalate (PET) (having a Young's Modulus of about 2.0 GPa to about 2.7 GPa), solid polystyrene (having a Young's Modulus of about 3.0 GPa to about 3.5 GPa), Acrylonitrile butadiene styrene (ABS) plastic (having a Young's Modulus of about 1.4 GPa to about 3.1 GPa) or any combination thereof, but example embodiments are not limited thereto and may encompass any known flexible material.

It will be understood that the flexible jetting nozzle 502 may be distinguishable from the bushing 25 and/or other portions of the jetting head assembly 5 based on comprising (partially or entirely) a flexible material having significantly greater flexibility (e.g., as indicated by Young's Modulus) in relation to the materials comprising the bushing 25 and/or other portions of the jetting head assembly 5, which may be referred to as "rigid" materials. For example, in contrast to the flexible material of the flexible jetting nozzle 502, which may have a Young's Modulus between about 0.001 and about 11.0 GPA, the bushing 25 may comprise steel (e.g., ASTM-A36 steel), which may have a Young's Modulus of about 200 GPa, titanium, which may have a Young's Modulus of about 100 GPa, any combination thereof, or the like. Accordingly, in some example embodiments, the flexible jetting nozzle 502 may be distinguished as partially or completely ("entirely," "fully," or the like) comprising a flexible material having a Young's Modulus that is less than about 10% of the Young's Modulus of the rigid material of the bushing 25. Restated, in some example embodiments, the flexible jetting nozzle 502 may be distinguished as comprising a flexible material, and some or all of a remainder of the assembly housing 15 (including for example the bushing 25) may be distinguished as comprising a rigid material, where the flexible material is distinguished from the rigid material by having a Young's Modulus that is less than about 10% of the Young's modulus of the rigid material.

In some example embodiments, the flexible jetting nozzle 502 may completely comprise a flexible material, such that the Young's Modulus of the flexible material comprising the flexible jetting nozzle 502 may also be referred to as a Young's Modulus of the flexible jetting nozzle 502.

Referring to FIGS. 5A-5C, in some example embodiments, the flexible jetting nozzle 502 may comprise all (e.g., an entirety) of the jetting nozzle 26, such that the jetting nozzle 26 is completely comprised of flexible material. As shown in FIGS. 5A-5C, outer surfaces 502*c* of the flexible jetting nozzle 502 may be attached to opposing surfaces 25*c* of the bushing 25 to fixedly attach the flexible jetting nozzle 502 to the bushing 25. In some example embodiments, said outer surfaces 502*c* may be fixedly attached to the opposing surfaces 25*c* of the bushing 25 via any well-known composition or method or adhering a flexible material to a more rigid material, including any well-known epoxy-based adhesive material, polyurethane-based adhesive material, cyanoacrylate-based adhesive material, any combination thereof, or the like. In some example embodiments, said outer surfaces 502*c* may be fixedly attached to the opposing surfaces 25*c* of the bushing 25 via sintering. In some example embodiments, the flexible jetting nozzle 502 may be coupled to the bushing 25 without use of an adhesive (e.g., a friction fit, a flange connection, or the like).

As shown in FIGS. 5A-5C, where the flexible jetting nozzle 502 comprises all of the jetting nozzle 26, an entirety of the bottom of the jetting chamber 24 may be defined by the inner surface 502*a* of the flexible jetting nozzle 502. As shown, the flexible conduit 504 may extend between an inlet orifice 504*a* (which may be the same as the inlet orifice 29 shown in FIG. 4) in the inner surface 502*a* and an outlet orifice 504*b* (which may be the same as the outlet orifice 30 shown in FIG. 4) in the outer surface 502*b* of the flexible jetting nozzle 502. As shown in FIGS. 5A-5C, the flexible conduit 504 may have the same structure and/or shape as the conduit 28 shown in FIG. 4, including having an upper, conical conduit and a lower, cylindrical conduit, but example embodiments are not limited thereto and the flexible conduit 504 may have any shape as described herein for conduit 28.

Still referring to FIGS. 5A-5C, the flexible conduit 504 includes a smallest diameter D that corresponds to a smallest cross-sectional flow area A of the flexible conduit 504.

Referring to FIGS. 6A-7C, in some example embodiments, the jetting nozzle 26 may include a rigid jetting nozzle 602 in addition to the flexible jetting nozzle 502, where the rigid jetting nozzle 602 includes a rigid material (e.g., a material having a Young's Modulus that is at least about 11 times greater in magnitude than the Young's Modulus of the flexible material at least partially comprising the flexible jetting nozzle 502). As shown in FIGS. 6A-7C, the rigid jetting nozzle 602 may be a part of the bushing 25, such that the rigid jetting nozzle 602 and the bushing 25 are a single, uniform part, but example embodiments are not limited thereto, and the rigid jetting nozzle 602 may in some example embodiments be a rigid structure that is coupled to the bushing 25 via any known method for coupling rigid material structure together (e.g., adhesives, welding, bolt connections, friction fit, etc.).

As shown in FIGS. 6A-7C, the rigid jetting nozzle 602 may include a rigid conduit 604 that extends through the rigid jetting nozzle 602, between an inlet orifice 620 in an inner surface 602*a* of the rigid jetting nozzle 602 and an outlet orifice 630 in an outer surface 602*b* of the rigid jetting nozzle 602. As further shown in FIGS. 6A-7C, the flexible jetting nozzle 502 may be coupled to the rigid jetting nozzle 602 (e.g., via any well-known methods for joining flexible and rigid materials, including non-adhesive joining methods such as a friction fit), such that the rigid jetting nozzle 602 is configured to hold the flexible jetting nozzle 502 in place in relation to the bushing 25, and the jetting device 1 is configured to cause the internal pressure of viscous medium in the jetting chamber 24 to increase to force the one or more droplets 40 of the viscous medium through both the flexible conduit 504 and the rigid conduit 604.

Referring generally to FIGS. 6A-7C, when the jetting nozzle 26 includes both the flexible jetting nozzle 502 and the rigid jetting nozzle 602, at least a portion of the flexible jetting nozzle 502 may be exposed to the jetting chamber 24. For example, at least a portion of the inner surface 502*a* may be exposed to the jetting chamber 24, either directly so as to at least partially define the jetting chamber (e.g., as shown in FIG. 6A-6C) or indirectly via the rigid conduit 604 (e.g., as shown in FIGS. 7A-7C). In some example embodiments, at least the exposed portion of the flexible jetting nozzle 502 may be deformed in response to variations of internal pressure of viscous medium 490 in the jetting chamber 24.

As shown in FIGS. 6A-6C, the flexible jetting nozzle 502 may be at least partially between the rigid jetting nozzle 602 and the jetting chamber 24, such that the flexible jetting nozzle 502 at least partially (e.g., entirely, as shown in FIGS. 6A-6C) isolates the rigid jetting nozzle 602 from direct exposure to, and from defining, the jetting chamber 24, and the flexible conduit 504 extends at least partially through the rigid conduit 604. In the example embodiments shown in FIGS. 6A-6C, the flexible jetting nozzle 502 includes a nose portion 506 that extends through the rigid conduit 604 of the rigid jetting nozzle 602 such that the outer surface 502*b* of the flexible jetting nozzle 502 is exposed by the rigid jetting nozzle 602 and may be coplanar to the outer surface 602*b* of the rigid jetting nozzle 602, although the outer surface 502*b* may not be coplanar with outer surface 602*b*. As shown, the flexible conduit 504 may extend through the nose portion 506 and thus extend through the rigid conduit 604, paraxially and/or coaxially therewith. As a result, it will be understood that viscous medium moving through the flexible conduit 504 may move through the rigid conduit 604 by virtue of moving through the flexible conduit that is itself at least partially extending through the rigid conduit 604. As shown, a surface 502*d* of the flexible jetting nozzle 502 may be in contact with a surface (e.g., inner surface 602*a*) of the rigid jetting nozzle 602 and may be held in contact with said surface via any known joining method, including adhesives, friction fitting, or the like. In some example embodiments, said surface 502*d* may be fixedly attached to a surface (e.g., inner surface 602*a*) of the rigid jetting nozzle 602 via any well-known composition or method or adhering a flexible material to a more rigid material, including any well-known epoxy-based adhesive material, polyurethane-based adhesive material, cyanoacrylate-based adhesive material, any combination thereof, or the like. In some example embodiments, said surface 502*d* may be fixedly attached to the surface (e.g., inner surface 602*a*) of the rigid jetting nozzle 602 via sintering. In some example embodiments, said surface 502*d* may be coupled to the surface (e.g., inner surface 602*a*) of the rigid jetting nozzle 602 without use of an adhesive (e.g., a friction fit, a flange connection, or the like).

As shown in FIGS. 6A-6C, the rigid conduit 614 may have any shape that any portion of the conduit 28 shown in FIG. 4 may have, including a truncated conical shape as shown. As shown, any diameter E1 of any portion of the rigid conduit 604 may be equal to or greater than the smallest diameter D of the flexible conduit 504, although it will be understood that in some example embodiments, a diameter E1 of at least a portion of the rigid conduit 604 may be smaller than a smallest diameter D of the flexible conduit 504. It will be understood that, based on the rigid jetting nozzle 602 including a rigid material, the diameter E1 of the rigid conduit 604 may remain fixed (e.g., fixed within manufacturing tolerances or material tolerances) in response to variations of internal pressure of viscous medium 490 in the jetting chamber 24. 3

As shown in FIGS. 6A-6C, a limited portion 582 of the flexible jetting nozzle 502 that is aligned with (e.g., overlaps with) the rigid conduit 604 may be a limited portion of the flexible jetting nozzle 502 that is deformed due to variation of the internal pressure of viscous medium 490 in the jetting chamber 24, as the portion 584 of the flexible jetting nozzle 502 that are aligned with the structure of the rigid jetting nozzle 602, and thus not aligned with the rigid conduit 604, may be limited in deformation by the underlying rigid jetting nozzle 602. Accordingly, in some example embodiments where the flexible jetting nozzle 502 is at least partially between the rigid jetting nozzle 602 and the jetting chamber 24, the flexible jetting nozzle 502 may be configured to undergo limited deformation in response to variations of internal pressure of viscous medium 490 in the jetting chamber 24 such that a limited portion 582 of the flexible jetting nozzle 502 that is aligned with the rigid conduit 604 is configured to deform and a remainder portion 584 of the flexible jetting nozzle 502 that is aligned with the structure of the rigid jetting nozzle 602, and thus is not aligned with the rigid conduit 604, is restricted in deformation by the rigid jetting nozzle 602. As used herein with regards to FIGS. 6A-6C, restricted deformation of a portion 584 of the flexible jetting nozzle 502 may refer to either no deformation of the portion 584 in response to variations of internal pressure of viscous medium 490 in the jetting chamber 24 or deformation that is less than the deformation of the portion 582 of the flexible jetting nozzle 502 that is aligned with (e.g., overlaps) the rigid conduit 604 of the rigid jetting nozzle 602.

As shown in FIGS. 7A-7C, the rigid jetting nozzle 602 may be between the flexible jetting nozzle 502 and the jetting chamber 24, where the flexible jetting nozzle 502 may be a layer of material, such as a membrane, on an outer surface 602*b* of the rigid jetting nozzle 602 and the flexible conduit 504 is aligned (e.g., overlaps) with the rigid conduit 604. The inner surface 602*a* of the rigid jetting nozzle 602 may at least partially define the jetting chamber 24 (e.g., a bottom surface thereof), the flexible jetting nozzle 502 may be at least partially isolated from the jetting chamber 24 by the rigid jetting nozzle 602, and the flexible and rigid conduits 504 and 604 are arranged in series, such that the inlet orifice 604*a* of the rigid conduit 604 is the same as the inlet orifice 29 of the jetting nozzle 26, the outlet orifice 504*b* of the flexible conduit 504 is the same as the outlet orifice 30 of the jetting nozzle 26, and orifices 604*b* and 504*a* are open to each other (and may have the same or different diameter, as shown in FIGS. 7A-7C). The jetting device 1 may be configured to force the one or more droplets 40 of the viscous medium 490 through the rigid conduit 604 and the flexible conduit 504 in series.

As shown in FIGS. 7A-7C, the diameter D of the inlet orifice 504*a* of the flexible conduit 504 may be different from (e.g., smaller than) the diameter E1 of the outlet orifice 604*b* of the rigid conduit 604, such that the flexible conduit 504 and at least a portion of the flexible jetting nozzle 502 is exposed (e.g., indirectly exposed) to the jetting chamber 24 via the rigid conduit 614 and thus is not isolated from the jetting chamber 24 and therefore at least the exposed portion of the flexible jetting nozzle 502 is configured to be deformed in response to changes in the internal pressure of the viscous medium 490 in the jetting chamber 24.

As shown in FIGS. 7A-7C, a limited portion 592 of the flexible jetting nozzle 502 that is aligned with (e.g., overlaps with) the rigid conduit 604, and thus is a limited portion of the flexible jetting nozzle 502 that is exposed to the jetting chamber 24, may be a limited portion of the flexible jetting nozzle 502 that is deformed due to variation of the internal pressure of viscous medium 490 in the jetting chamber 24, while the one or more portions 594 of the flexible jetting nozzle 502 that are isolated from exposure to the jetting chamber 24 by the rigid jetting nozzle 602 may be limited in deformation due to being isolated from being acted upon by the pressure of the viscous medium 490 in the jetting chamber 24. Accordingly, in some example embodiments where the flexible jetting nozzle 502 is at least partially isolated from the jetting chamber 24 by the rigid jetting nozzle 602, the flexible jetting nozzle 502 may be configured to undergo limited deformation such that a limited portion 592 of the flexible jetting nozzle 502 that is aligned with the rigid conduit 604 and thus is a limited portion of the flexible jetting nozzle 502 that is exposed to the jetting chamber 24 is configured to deform and a remainder portion 594 of the flexible jetting nozzle 502 that is aligned with the structure of the rigid jetting nozzle 602 and thus is not aligned with the rigid conduit 604, and thus is isolated from exposure to the jetting chamber 24, is restricted in deformation by the rigid jetting nozzle 602. As used herein with regards to FIGS. 7A-7C, restricted deformation of a portion 594 of the flexible jetting nozzle 502 may refer to either no deformation of the portion 594 in response to variations of internal pressure of viscous medium 490 in the jetting chamber 24 or deformation that is less than the deformation of the portion 592 of the flexible jetting nozzle 502 that is exposed to the jetting chamber 24 by the rigid jetting nozzle 602.

Referring now to FIGS. 5A-5C, 6A-6C, 7A-7C, 8A-8C, and 9, at least a portion of the flexible jetting nozzle 502 (e.g., a portion that is exposed to the jetting chamber 24), based at least in part upon including the flexible material as described herein, is configured to deform (e.g., reversibly or partially reversibly) from a rest state (also referred to as a rest shape) to a deformed state (also referred to as a deformed shape) in response to increased internal pressure of viscous medium 490 in the jetting chamber 24 (e.g., during an expansion phase of a jetting operation) to cause a cross-sectional flow area A (e.g., a smallest cross-sectional flow area) of at least a particular portion of the flexible conduit 504 (e.g., the narrowest portion of the flexible conduit 504) to dilate from a rest area (A=A1) to a greater dilated area (A=A2) in proportion to variation of internal pressure of the viscous medium in the jetting chamber 24. In some example embodiments, at least a portion of the flexible jetting nozzle 502 (e.g., a portion that is exposed to the jetting chamber 24), based at least in part upon including the flexible material as described herein, is configured to relax (e.g., reversibly or partially reversibly) from the deformed state to the rest state in response to decreased internal pressure of viscous medium 490 in the jetting chamber 24 (e.g., during a relaxation phase of a jetting operation) to cause the cross-sectional flow area A (e.g., the smallest cross-sectional flow area) of at least the particular portion of the flexible conduit 504 to contract from the dilated area (A2) to the rest area (A1).

The flexible jetting nozzle 502 may be at least partially deformed from the rest state to the deformed state due to increased internal pressure of viscous medium 490 in the jetting chamber 24, from a rest pressure (e.g., P=P1) to a jetting pressure (e.g., P=P2), during a jetting operation, due to the impacting device 21 reducing the volume of the jetting chamber 24 based on moving through the piston bore 35, so that the size and/or shape of the flexible conduit 504 is caused to deform, to cause a cross-sectional flow area A of at least a portion of the flexible conduit 504 (e.g., a narrowest portion) to increase, and the flexible jetting nozzle 502 may at least partially return ("relax") from the deformed state to the rest state upon the internal pressure in the jetting chamber 24 returning to the rest pressure at the conclusion of the jetting operation (e.g., based on the impacting device 21 moving through the piston bore 35 to increase the volume of the jetting chamber 24).

As a result of such variable dilation/contraction of a cross-sectional flow area A of at least a portion of the flexible conduit 504, which is caused by variable deformation (e.g., reversible or partially reversible) of at least a portion of the flexible jetting nozzle 502 (e.g., the portion that is exposed to the jetting chamber 24) as a result of varying internal pressure of viscous medium 490 in the jetting chamber 24, the flow of viscous medium 490 through the flexible conduit 504 to jet a droplet 40 and to induce "cut off" of the droplet 40 from the remainder of the viscous medium 490 in the jetting chamber 24 may be controlled with improved precision, thereby improving the performance and reliability of the jetting device 1.

FIGS. 5A, 6A, 7A, and 8A each show a rest state of the jetting device 1 that includes a flexible jetting nozzle 502 in a rest state ("rest shape"). Referring now FIG. 9 in view of FIGS. 5A, 6A, 7A, and 8A, in a jetting operation that begins at time $t_0$, the impacting device 21 may be in a rest position in relation to the bushing 25, such that the impact end surface 23 of the plunger 21*b* is at a first position L1 in relation to the bushing 25 and thus the jetting chamber 24 that is defined by the jetting nozzle 26, bushing 25, and impacting device 21 has a first, rest volume V1. As shown in FIGS. 5A, 6A, 7A, and 8A the jetting chamber 24 is filled with viscous medium 490. In addition, in FIGS. 5A, 6A, 7A, and 8A at least a portion of the flexible conduit 504 (FIGS. 5A and 6A) and/or rigid conduit 604 (FIG. 7A) that is directly exposed to the jetting chamber 24 may be at least partially filled with the viscous medium 490, although example embodiments are not limited thereto. For example, in some example embodiments, the flexible conduit 504 may be partially or entirely free ("empty") of viscous medium (e.g., entirely free of viscous medium 490 in the cylindrical conduit portion of the flexible conduit 504 and only partially filled with viscous medium in the conical conduit portion of the flexible conduit 504) and instead may be occupied by air. Additionally, in at least the example embodiments shown in FIG. 7A, the rigid conduit 604 may also be at least partially free of viscous medium 490.

It will be understood that the internal pressure of the viscous medium 490 in the jetting chamber 24 at the rest state as shown in FIGS. 5A, 6A, and 7A may be a first pressure P1, also referred to herein as a rest pressure. The first pressure P1 may be the hydrostatic pressure of the viscous medium 490 alone, but example embodiments are not limited thereto. For example, the first pressure P1 may be caused by the jetting chamber 24 being slightly pressurized above the hydrostatic pressure of the viscous medium 490.

As shown in FIGS. 5A, 6A, 7A, and 8A the flexible jetting nozzle 502 is configured to be in a rest state, or non-deformed state, when the internal pressure of the viscous medium 490 in the jetting chamber 24 is the rest pressure (first pressure P1). As shown in FIG. 8A, a cross-sectional flow area A (e.g., smallest cross-sectional flow area) of a given portion (e.g., a narrowest portion) of the flexible conduit 504 when the flexible jetting nozzle 502 is in the rest state may be a first area A1, based on the corresponding diameter D of the given portion of the flexible conduit 504 being a first diameter D=D1. As shown in FIGS. 5A, 6A, 7A, and 8A, it will be understood that the cross-sectional flow area A (e.g., smallest cross-sectional flow area) of a given portion of the flexible conduit 504 may be equal to $\frac{1}{4}\pi(D^2)$ when the given portion of the flexible conduit 504 is a circular cylinder conduit portion so that the cross-sectional flow area A is circular in shape, but it will be understood that a given cross-sectional flow area A of the given portion of the flexible conduit 504 may have any well-known cross-sectional shape.

In some example embodiments, the first area A1 of the cross-sectional flow area A (e.g., smallest cross-sectional flow area) of a given portion (e.g., narrowest portion) of the flexible conduit 504 is too small to accommodate viscous medium 490 flow through the portion (e.g., narrowest portion) of the flexible conduit 504 when the flexible jetting nozzle 502 is in the rest state, as shown in FIGS. 5A, 6A, 7A, and 8A. As a result, excess loss of viscous medium 490 between jettings may be reduced or prevented.

Referring now to FIG. 9, the jetting device 1 may be in a rest state during a rest period $P_{Rt}$ from time $t_0$ to time $t_1$, during which a driving voltage applied to the impacting device 21 (e.g., by the control device 1100) is a first, rest voltage V1, and thus the internal pressure P in the jetting chamber 24 is a rest pressure (e.g., first pressure P1) and thus the cross-sectional flow area A (e.g., smallest cross-sectional flow area) of a portion (e.g., narrowest portion) of the flexible conduit 504 is the rest area, first area A1.

As shown in FIG. 9, at time $t_1$, the control device 1100 may cause the driving voltage applied to the impacting device 21 to change, in a single step change or gradually over a period of time, to a second, jetting voltage V2, which causes the impacting device 21 (e.g., based on the impacting device 21 including a piezoelectric actuator part 21*a*) to move downwards through the piston bore 35 to reduce the volume of the jetting chamber 24, thereby increasing the internal pressure P of the viscous medium 490 in the jetting chamber 24 from the rest pressure P1 to a greater jetting pressure, also referred to as a second pressure P2, due to the volume reduction in the jetting chamber 24. As shown in FIG. 9, the increase in pressure P may rise rapidly from time $t_1$ to $t_2$ based on the plunger 21*b* of the impacting device 21 moving downwards through the piston bore 35 between time $t_1$ and time $t_2$, such that the internal pressure P stops rising at time $t_2$ in response to the plunger 21*b* stopping its downward movement so that the impact end surface 23 is at a lower second position L2. As a result of such internal pressure P increase, the jetting device 1 may be in a jetting state wherein the viscous medium 490 is forced out of the jetting chamber 24, via the outlet orifice 30 in one or more droplets 40 of viscous medium. Such an increase in pressure P between time $t_1$ and $t_2$ may be an "expansion phase" $P_E$ of the jetting operation.

It will be understood that the variation in pressure P and the variations in diameter D and cross-sectional flow area A of the flexible jetting nozzle 502 in FIG. 9 are not rigidly coupled so as to occur simultaneously and/or in lockstep with each other (e.g., where the variation in diameter D and area A are directly proportional to the variation in pressure P and occur over a same, fixed time period). For example, in some example embodiments, the variation in diameter D and cross-sectional flow area A shown in FIG. 9 may occur over a period of time that is different from the period of time over which the pressure P varies, and the variation in diameter and cross-sectional flow area A may or may not be directly proportional to the variation in pressure P. However, in some example embodiments, the variations of pressure P, diameter D, and cross-sectional flow area A may be rigidly coupled.

Referring back to FIGS. 5B, 6B, 7B, and 8B, each drawing shows the jetting device 1 in a jetting state based on the impact end surface 23 of the plunger 21*b* having moved 510, 610, 710 downwards through the piston bore 35, from position L1 to position L2, such that the volume of the jetting chamber 24 is reduced from a rest volume to a second, smaller jetting volume and thus the internal pressure P of viscous medium 490 in the jetting chamber 24 is increased from the rest pressure (first pressure P1) to the greater jetting pressure (second pressure P2). In some example embodiments, the rest pressure (first pressure P1) that is the internal pressure of viscous medium in the jetting chamber 24 when the jetting device is in the rest state, and thus the flexible jetting nozzle 502 is in the rest state, is about 1 bar. In some example embodiments, the jetting pressure (second pressure P2) that is the internal pressure of viscous medium in the jetting chamber 24 when the jetting device is in the jetting state, and thus the flexible jetting nozzle 502 is in the deformed state, is about 100 bar.

As further shown in FIGS. 5B, 6B, 7B, and 8B, the flexible jetting nozzle 502 is caused to be at least partially deformed 1201 due to the increased internal pressure P of the viscous medium 490 in the jetting chamber 24 which is exerted on at least a portion of the flexible jetting nozzle 502 that is at least partially exposed to the jetting chamber 24. As shown in FIGS. 5B, 6B, 7B, and 8B, the deformation 1201 may be a combination of axial deformation (e.g., deforming downwards, away from the jetting chamber along axis 1202) and radial deformation (outwards, orthogonal to and away from axis 1202). As a result of such deformation 1201 of the flexible jetting nozzle 502 during the expansion phase $P_E$ due to the increased internal pressure P of viscous medium 490 in the jetting chamber 24, the shape, volume, or a combination thereof of the flexible conduit 504 may be changed. Such change may include the volume of the flexible conduit 504 being increased due to the increased internal pressure P2 and/or the shape of the flexible conduit 504 being changed due to the increased internal pressure P2, such that at least a given cross-sectional flow area A of at least a portion of the flexible conduit 504 (the same portion shown in FIG. 8B) is at least partially widened (e.g., dilated), such that the given cross-sectional flow area A of the given portion of the flexible conduit 504 is increased from the rest area A1 (as shown for the given portion of the flexible conduit 504 in FIG. 8A) to a deformed area A2 that is greater than the rest area A1 (as shown for the same given portion of the flexible conduit 504 in FIG. 8B), such that the corresponding diameter D of the given portion of the flexible conduit 504 is increased from the first diameter D1 to the greater second diameter D2 (as shown in FIGS. 8A and 8B). The given cross-sectional flow area A of the given portion of the flexible conduit 504 may change shape when changing from the rest state (shown in FIGS. 5A, 6A, 7A, and 8A) to the deformed state (shown in FIGS. 5B, 6B, 7B, and 8B) due to deformation of the flexible jetting nozzle 502 (e.g., changing from a circular cylindrical conduit to a truncated conical conduit), but example embodiments are not limited thereto, and the flexible conduit 504 may, in some example embodiments, retain the same general shape during deformation or may be changed into any different shape.

Still referring to FIGS. 5B, 6B, 7B, and 8B, the widened (e.g., dilated) given cross-sectional flow area A of the given portion of the flexible conduit 504 (which is the same portion that is shown in FIG. 8A) may facilitate flow of viscous medium 490 from the jetting chamber and through the outlet orifice 30 via the cross-sectional flow area A as one or more droplets 40. Referring back to FIG. 9, the impact end surface 23 of the impacting device 21 may be maintained at the second position L2, from time $t_2$ to time $t_3$, for example based on the control device 1100 maintaining a particular applied drive voltage to the impacting device 21, so that the internal pressure of the viscous medium 490 jetting chamber 24 is maintained at approximately (e.g., within 10% of) the second pressure P2 for the same period of time (which may be considered to be a hold phase $P_H$ as shown in FIG. 9), and thus the given cross-sectional flow area A of the portion of the flexible conduit 504 may be maintained at the deformed area A2 for the same period of time, to enable viscous medium 490 flow through the jetting nozzle 26 (e.g., the flexible jetting nozzle 502 alone or a combination thereof with the rigid jetting nozzle 602) to form a droplet 40 of viscous medium 490. It will be understood that, during the expansion phase $P_E$ and hold phase $P_H$ of the jetting operation as shown in FIG. 9, the hydrodynamic resistance of the flexible jetting nozzle 502 may be reduced as a result of being deformed from the rest state to the deformed state, thereby enabling viscous medium 490 flow through at least the flexible jetting nozzle 502 to the outlet orifice 30 during the expansion phase $P_E$ and hold phase $P_H$.

Still referring to FIG. 9, at time $t_3$, the control device 1100 may adjust the drive voltage applied to the impacting device 21 (in a step change or gradually over a period of time) to cause the impact end surface 23 of the plunger 21*b* to begin to move upwards, out of the piston bore 35 and back to the rest position L1 at time $t_4$, to enlarge the jetting chamber 24 to the rest volume V1 and thus reduce the internal pressure P of the viscous medium 490 in the jetting chamber 24 back to the rest, first pressure P1. As shown in FIG. 9, such a period of the jetting operation may be referred to as relaxation phase $P_{RX}$. As shown in FIG. 9, the rate of change of internal pressure P may be different during the expansion phase $P_E$ than during the relaxation phase PR of the jetting operation (e.g., time $t_3$ to $t_4$). For example, as shown, the control device 1100 may adjust the application of drive voltage to the impacting device 21 to cause the impact end surface 23 of the impacting device 21 to move more quickly from position L1 to L2 during the expansion phase $P_E$, from time $t_1$ to $t_2$, than the rate at which the impact end surface 23 of the impacting device 21 moves from position L2 to L1 during the relaxation phase $P_{RX}$, from time $t_3$ to $t_4$, but example embodiments are not limited thereto, and in some example embodiments the impact end surface 23 of the impacting device 21 may move at the same rate during the expansion and relaxation phases $P_E$ and $P_{RX}$. In some example embodiments, the duration of the expansion phase $P_E$ (e.g., the duration of elapsed time from time $t_1$ to $t_2$) may be less than about 20 μs (microseconds), and the duration of the relaxation phase $P_{RX}$ (e.g., the duration of elapsed time from time $t_3$ to $t_4$) may be between about 20 μs and about 100 μs.

As still shown in FIG. 9, and referring now to FIGS. 5C, 6C, 7C, and 8C, the flexible jetting nozzle 502 may relax 1204 from the deformed state shown in FIGS. 5B. 6B, 7B, and 8B back to the rest state (also shown in FIGS. 5A, 6A, 7A, and 8A) as a result of the drop in internal pressure P of viscous medium 490 in the jetting chamber 24 from P2 to P1 as a result of the impacting device 21 returning to the rest position (such that the impact end surface 23 is at position L1). As a result of such relaxation, the flexible conduit 504 may return to the rest state, shape, and volume, so that the above-noted given cross-sectional flow area A of the given portion of the flexible conduit 504 shown in FIGS. 8A-8B relaxes from the deformed area A2 to the smaller rest area A1 (as shown in FIG. 8C), such that the corresponding diameter D of said given portion of the flexible conduit 504 relaxes from the deformed diameter D2 to the rest diameter D1. It will be understood that, in some example embodiments, the flexible conduit 504 may not completely return to the rest state when the internal pressure P returns to the rest pressure (pressure P1), such that the above-noted given cross-sectional flow area A of the given portion of the flexible conduit 504 may relax from the deformed area A2 to a smaller new rest area A1' that is greater from the initial rest area A1, and the corresponding diameter D of said given portion of the flexible conduit 504 may relax from the deformed diameter D2 to a new rest diameter D1' that is greater than the initial rest area D1. As shown in FIG. 9, the relaxation of the cross-sectional flow area A may occur at a rate that corresponds to the rate of change of internal pressure P in the jetting chamber, from time $t_3$ to $t_4$, such that the cross-sectional flow area A of a given portion of the flexible conduit 504 may decrease during the relaxation phase $P_{RX}$ at a rate that is smaller than the rate of increase of the cross-sectional flow area A of the given portion of the flexible conduit 504 during the expansion phase $P_E$.

It will be understood that, in some example embodiments, the diameter D of a given portion of the flexible conduit 504, for example a diameter D of a narrowest portion of the flexible conduit 504 (and thus a smallest diameter of the flexible conduit 504) may have a rest diameter D1 value that is between about 50 μm (micrometers) to about 300 μm, which may correspond to a rest area A1 value that is between about 1,963 $\mu m^2$ and about 70,686 $\mu m^2$, but example embodiments are not limited thereto. It will be understood that, in some example embodiments, a thickness of the flexible jetting nozzle 502 (e.g., a distance between opposite surfaces 502*a* and 502*b*) may be between about 50 μm and about 600 μm, but example embodiments are not limited thereto.

Still referring to FIGS. 5C, 6C, 7C, and 8C, the reduction (e.g., constriction) of a given cross-sectional flow area A of the given portion of the flexible conduit 504 (e.g., smallest cross-sectional flow area A of the narrowest portion of the flexible conduit 504) during the relaxation phase $P_{RX}$ as a result of the drop in internal pressure P of the viscous medium 490 in the jetting chamber 24 may reduce, or "choke" the flow of viscous medium 490 through the outlet orifice 30 and may thus provide a pinching mechanism to induce a break-off of the formed droplet 40 of viscous medium from the remainder viscous medium 490 in the jetting chamber 24 and the jetting nozzle 26 (which includes the flexible jetting nozzle 502). As a result of the break-off being at least partially controlled by flexible conduit 504 flow area constriction, which can be at least partially controlled based on controlling the rate of relaxation of internal pressure P of viscous medium 490 in the jetting chamber 24 via control of the rate of movement of the impacting device 21, as shown in FIG. 9, the break-off of droplets 40 can be controlled with improved precision, thereby improving the quality and consistency of said droplets.

While the given cross-sectional flow area A of the corresponding given portion of the flexible jetting nozzle 504 as described above are described to expand during the expansion phase and to contract during the relaxation phase of the jetting operation, it will be understood that different portions of the flexible conduit 504 may change cross-sectional flow area differently during the expansion and relaxation phases. For example a cross-sectional flow area of the inlet orifice

504*a* of the flexible conduit 504 may expand at a smaller rate than the cross-sectional flow area of the outlet orifice 504*b* during the expansion phase, which may thus configure the flexible jetting nozzle 502 to limit the flow of viscous medium through the flexible conduit 504 during a jetting operation, so as to control an amount of viscous medium 490 in a given droplet 40.

In some example embodiments, the proportional change of a given cross-sectional flow area A of a given portion of the flexible conduit 504 (e.g., the smallest cross-sectional flow area A of the flexible conduit 504 at the narrowest portion of the flexible conduit 504), between the rest area A1 and the deformed area A2, may be relatively small, for example about 1% to about 50% change in area, such that the flexible jetting nozzle may be understood to be configured to deform to cause the given cross-sectional flow area of A the flexible conduit 504 to dilate by about 1% to about 50% in response to an increase of the internal pressure P of the viscous medium 490 in the jetting chamber 24.

In some example embodiments, the proportional change of a given cross-sectional flow area A of a given portion of the flexible conduit 504 (e.g., the smallest cross-sectional flow area A of the flexible conduit 504 at the narrowest portion of the flexible conduit 504), between the rest area A1 and the deformed area A2, may be relatively large, for example about 50% to about 1000% change in area, or potentially more than 1000% change in area, such that the flexible jetting nozzle may be understood to be configured to deform to cause the cross-sectional flow area of A the flexible conduit 504 to dilate by about 50% to about 1000%, or more than 1000%, in response to an increase of the internal pressure P of the viscous medium 490 in the jetting chamber 24. In some example embodiments, the proportional change of a given cross-sectional flow area A of a given portion of the flexible conduit 504 (e.g., the smallest cross-sectional flow area A of the flexible conduit 504 at the narrowest portion of the flexible conduit 504), between the rest area A1 and the deformed area A2, may be, for example about 400% change in area, such that the flexible jetting nozzle may be understood to be configured to deform to cause the cross-sectional flow area of A the flexible conduit 504 to dilate by about 400%, in response to an increase of the internal pressure P of the viscous medium 490 in the jetting chamber 24.

In some example embodiments, the jetting device 1 that includes the flexible jetting nozzle 502 may be configured to have reduced utilization of air (e.g., pressurized air supplied to the jetting head assembly 5 to at least partially maintain viscous medium flow to the jetting chamber 24) during jetting operations based on including the flexible jetting nozzle 502. For example, during the expansion phase $P_E$, air may be emitted through the jetting nozzle 26 based on displacement caused by the movement of the impacting device 21 through the piston bore 35 to reduce the volume of the jetting chamber 24. In some example embodiments, air consumption by the jetting device 1 during a given jetting operation (e.g., as shown in FIG. 8) may be reduced based on the deformation of the flexible jetting nozzle 502 reducing the displacement of air as a result of the movement of the impacting device 21 in the expansion phase $P_E$. Accordingly, for example, the volume of air consumed by the jetting device 1 in association with each jetting operation (e.g., as shown in FIG. 8) may be reduced by an amount that corresponds with a volume of space through which the flexible jetting nozzle 502 moves during the deformation and subsequent relaxation of at least a portion of the flexible jetting nozzle 502 during the jetting operation. Due to the reduction of air consumption by the jetting device 1 as a result, operational efficiency of the jetting device 1 may be improved based on including the flexible jetting nozzle 502.

Figure 10:
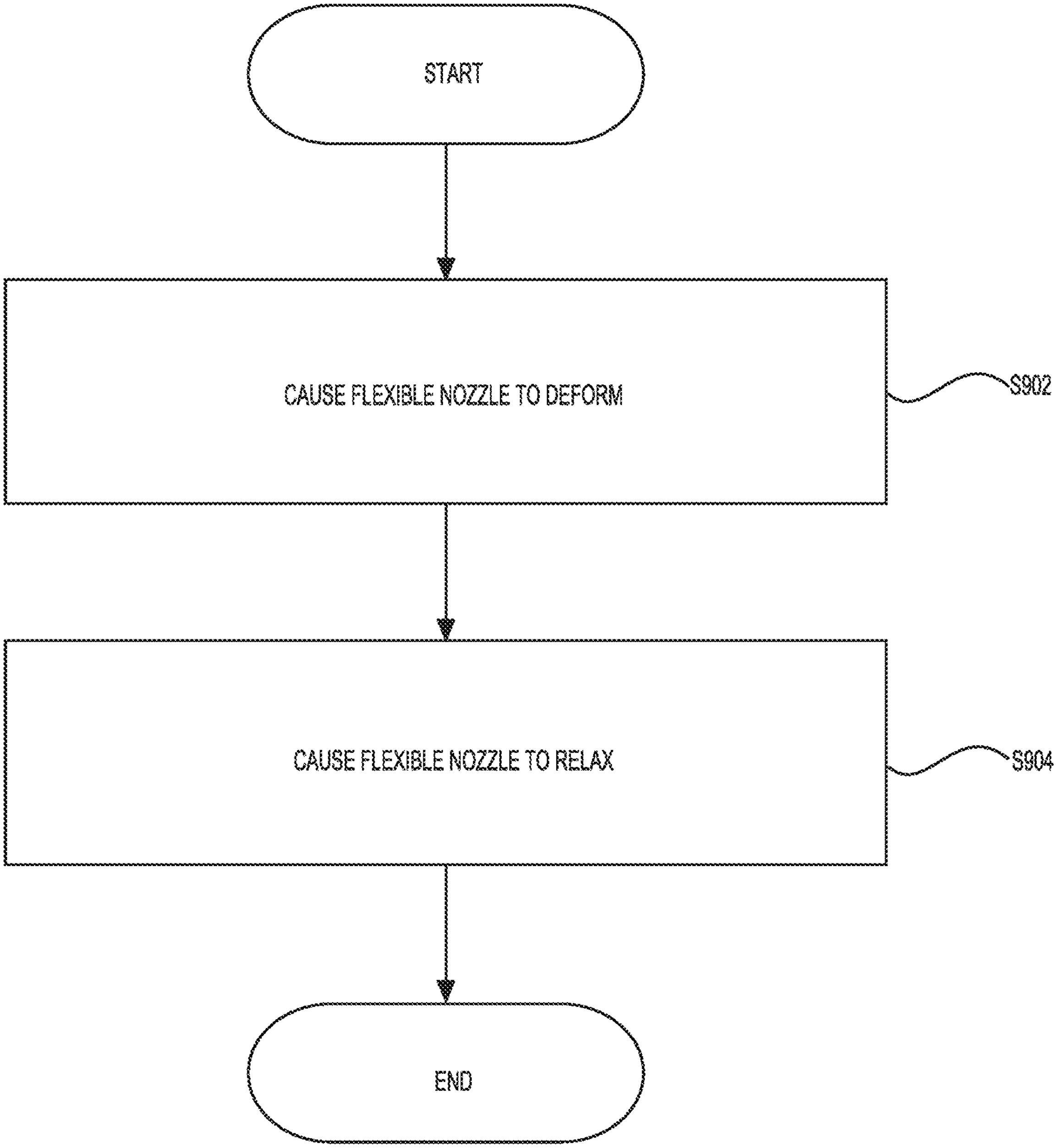
FIG. 10 is a flowchart illustrating a method of operating a jetting device to jet one or more droplets according to some example embodiments of the technology disclosed herein.

FIG. 10 is a flowchart illustrating a method of operating a jetting device to jet one or more droplets according to some example embodiments of the technology disclosed herein. The method shown in FIG. 10 may be implemented by a jetting device 1 that includes a flexible jetting nozzle 502 according to any of the example embodiments included herein.

At S902, the internal pressure P of viscous medium 490 in the jetting chamber 24 may be caused to increase (e.g., from a first pressure P1 to a second pressure P2 as shown in FIG. 9) so as to cause at least a portion of the flexible jetting nozzle 502 of the jetting device 1 (e.g., a portion of the flexible jetting nozzle 502 that is exposed to the jetting chamber 24) to deform from a rest state to a deformed state in response to the increased internal pressure P (e.g., as shown in FIGS. 5B, 6B, 7B, and 8B), thereby causing a cross-sectional flow area A of at least a portion of the flexible conduit 504 of the flexible jetting nozzle 502 (e.g., a smallest cross-sectional flow area A of the flexible conduit 504, at a narrowest portion of the flexible conduit 504) to widen (e.g., dilate). The internal pressure P may be caused to increase from a particular first pressure P1 to a particular second pressure P2 based on controllably causing the internal volume of the jetting chamber 24 to be controllably reduced from a particular first volume to a particular smaller second volume based on causing the impacting device 21 to at least partially move into through the piston bore 35 (e.g., move the impact end surface 23 of the plunger 21*b* from a first position L1 in the piston bore 35 to a second, lower position L2). The movement of the impacting device 21 can be controlled based on the control device 1100 transmitting a control signal to the impacting device that includes a particular driving voltage associated with causing the impacting device 21 to move through the piston bore 35 to cause the internal pressure P to increase to the second pressure P2. The control device 1100 may generate a control signal that, when received at the impacting device 21, causes the impacting device 21 to move through the piston bore 35 at a relatively rapid first rate so as to cause the cross-sectional flow area A of the portion of the flexible conduit 504 to widen (e.g., dilate) at a corresponding, rapid first rate.

Operation S902 may include implementing the expansion phase $P_E$ of a jetting operation as shown in FIG. 9. As a result of increasing the internal pressure P, operation S902 may include reducing a hydrodynamic resistance of the flexible jetting nozzle 502 and thus causing viscous medium 490 flow from the jetting chamber 24 and through the flexible conduit 504 to the outlet orifice 30 to form a droplet 40.

At S904, the internal pressure P of viscous medium 490 in the jetting chamber 24 may be caused to decrease (e.g., from the second pressure P2 to the first pressure P1 as shown in FIG. 9) so as to cause the same portion of the flexible jetting nozzle 502 of the jetting device 1 (e.g., the portion of the flexible jetting nozzle 502 that is exposed to the jetting chamber 24) to relax from the deformed state to a rest state (which may be the same initial rest state at the start of S902) in response to the reduced internal pressure P (e.g., as shown in FIGS. 5C, 6C, 7C, and 8C), thereby causing the cross-sectional flow area A of the portion of the flexible conduit 504 of the flexible jetting nozzle 502 (e.g., the cross-sectional flow area A of the flexible conduit 504 that is the smallest cross-sectional flow area A in the rest state of the flexible conduit 504 to contract (e.g., shrink). The internal pressure P may be caused to decrease from the particular second pressure P2 back to the particular first pressure P1 based on controllably causing the internal volume of the jetting chamber 24 to be controllably increased from the particular second volume back to the particular larger first volume based on causing the impacting device 21 to at least partially move into through the piston bore 35 (e.g., move the impact end surface 23 of the plunger 21*b* from the second position L2 in the piston bore 35 back to the first, higher position L1). The movement of the impacting device 21 can be controlled based on the control device 1100 transmitting a control signal to the impacting device that includes a particular driving voltage associated with causing the impacting device 21 to move through the piston bore 35 to cause the internal pressure P to decrease to the first pressure P1. The control device 1100 may generate a control signal that, when received at the impacting device 21, causes the impacting device 21 to move through the piston bore 35 at a relatively gradual second rate that is smaller than the first rate so as to cause the cross-sectional flow area A of the portion of the flexible conduit 504 to contract (e.g., shrink) at a corresponding, gradual second rate.

Operation S904 may include implementing the relaxation phase $P_{RX}$ of a jetting operation as shown in FIG. 9. As a result of decreasing the internal pressure P, operation S904 may include increasing a hydrodynamic resistance of the flexible jetting nozzle 502 and thus limiting and/or inhibiting ("choking") viscous medium 490 flow from the jetting chamber 24 and through the flexible conduit 504 to the outlet orifice 30 and to further provide a pinching mechanism to break-off the droplet 40 from the assembly housing 15.

It will be understood that, in some example embodiments, the jetting device 1 may include a different pressurization system than an impacting device 21, for example where the jetting chamber 24 remains at a fixed volume during operations S902 and S904, such that the internal pressure P may be caused to increase or decrease based on controlling an application of a pressurized gas (e.g., pressurized air) to the jetting chamber 24 (e.g., based on control signals provided by the control device 1100 to a flow generator 6 that may provide the pressurized gas and/or a control valve to controllably supply the pressurized gas to the jetting chamber 24).

Figure 11:
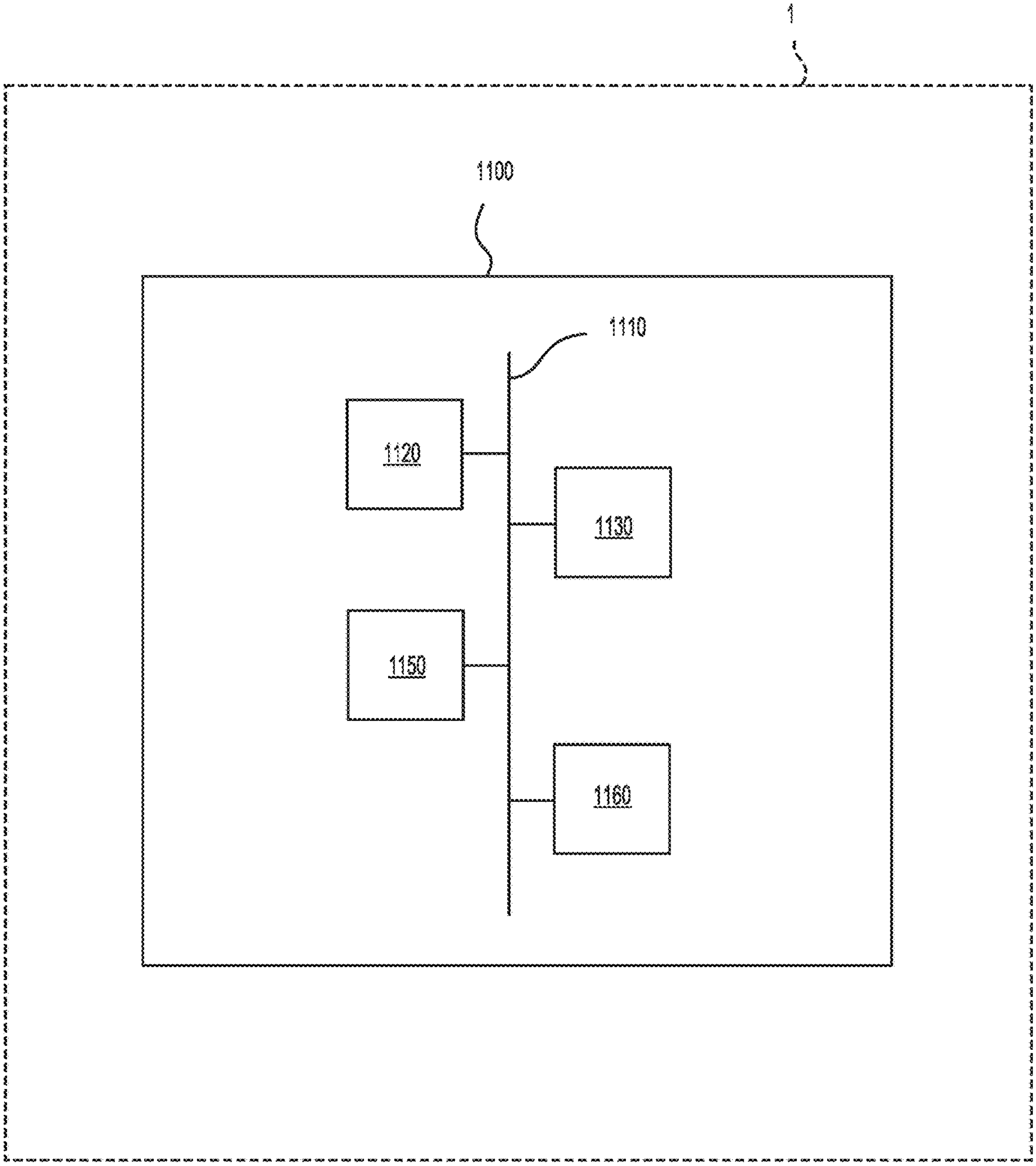
FIG. 11 is a schematic diagram illustrating a jetting device that includes a control device according to some example embodiments of the technology disclosed herein.

FIG. 11 is a schematic diagram illustrating a jetting device 1 that includes a control device 1100 according to some example embodiments of the technology disclosed herein. The jetting device 1 shown in FIG. 11 may be a jetting device 1 according to any of the example embodiments illustrated and described herein, including any one of the jetting devices 1 and/or jetting head assemblies 5 illustrated in FIGS. 1-4, FIGS. 5A-5C, FIGS. 6A-6C, FIGS. 7A-7C, and FIGS. 8A-8C.

In some example embodiments, including the example embodiments shown in FIG. 11, the control device 1100 may be included in a jetting device 1. In some example embodiments, the control device 1100 may include one or more computing devices. A computing device may include a personal computer (PC), a tablet computer, a laptop computer, a netbook, some combination thereof, or the like.

In some example embodiments, including the example embodiments shown in FIG. 11, the control device 1100 may be included in, may include, and/or may be implemented by, one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., a memory), for example a solid state drive (SSD), storing a program of instructions, and a processor configured to execute the program of instructions to implement the functionality of the control device 1100 according to any of the example embodiments herein, and thus to implement one or more jetting operations of the jetting device 1 according to any example embodiments as described herein.

Referring to FIG. 11, the control device 1100 may include a memory 1120, a processor 1130, a communication interface 1150, and a control interface 1160. The memory 1120, the processor 1130, the communication interface 1150, and the control interface 1160 may communicate with one another through a bus 1110.

The communication interface 1150 may communicate data from an external device using various network communication protocols. For example, the communication interface 1150 may communicate sensor data generated by a sensor (not illustrated) of the control device 1100 to an external device. The external device may include, for example, an image providing server, a display device, a mobile device such as, a mobile phone, a smartphone, a personal digital assistant (PDA), a tablet computer, and a laptop computer, a computing device such as a personal computer (PC), a tablet PC, and a netbook, an image outputting device such as a TV and a smart TV, and an image capturing device such as a camera and a camcorder.

The processor 1130 may execute a program of instructions and control the control device 1100. The processor 1130 may execute a program of instructions to control one or more portions of the jetting device 1 via generating and/or transmitting control signals to one or more elements of the jetting device 1 according to any of the example embodiments, including one or more jetting operations to cause one or more droplets of viscous medium to be jetted (e.g., to a board 2), via one or more control interfaces 1160. A program of instructions to be executed by the processor 1130 may be stored in the memory 1120.

The memory 1120 may store information. The memory 1120 may be a volatile or a nonvolatile memory. The memory 1120 may be a non-transitory computer readable storage medium. The memory may store computer-readable instructions that, when executed by at least the processor 1130, cause the at least the processor 1130 to execute one or more methods, functions, processes, etc. as described herein. In some example embodiments, the processor 1130 may execute one or more of the computer-readable instructions stored at the memory 1120.

In some example embodiments, the control device 1100 may transmit control signals to one or more of the elements of the jetting device 1 to execute and/or control a jetting operation whereby one or more droplets are jetted (e.g., to a board 2). For example, the control device 1100 may transmit one or more sets of control signals to one or more flow generators, actuators, control valves, some combination thereof, or the like, according to one or more programs of instruction. Such programs of instruction, when implemented by the control device 1100 may result in the control device 1100 generating and/or transmitting control signals to one or more elements of the jetting device 1 to cause the jetting device 1 to perform one or more jetting operations.

In some example embodiments, the control device 1100 may generate and/or transmit one or more sets of control signals according to any of the timing charts illustrated and described herein, including the timing chart illustrated in FIG. 9. In some example embodiments, the processor 1130 may execute one or more programs of instruction stored at the memory 1120 to cause the processor 1130 to generate and/or transmit one or more sets of control signals according to the timing chart illustrated in FIG. 9.

In some example embodiments, the communication interface 1150 may include a user interface, including one or more of a display panel, a touchscreen interface, a tactile (e.g., "button," "keypad," "keyboard," "mouse," "cursor," etc.) interface, some combination thereof, or the like. Information may be provided to the control device 1100 via the communication interface 1150 and stored in the memory 1120. Such information may include information associated with the board 2, information associated with the viscous medium to be jetted to the board 2, information associated with one or more droplets of the viscous medium, some combination thereof, or the like. For example, such information may include information indicating one or more properties associated with the viscous medium, one or more properties (e.g., size) associated with one or more droplets to be jetted to the board 2, some combination thereof, or the like.

In some example embodiments, the communication interface 950 may include a USB and/or HDMI interface. In some example embodiments, the communication interface 1150 may include a wireless network communication interface.

The foregoing description has been provided for purposes of illustration and description. It is not intended to be exhaustive. Individual elements or features of a particular example embodiment are generally not limited to that particular example, but are interchangeable where applicable and can be used in a selected embodiment, even if not specifically shown or described. The same may also be varied in many ways. Such variations are not to be regarded as a departure from example embodiments, and all such modifications are intended to be included within the scope of the example embodiments described herein.

The invention claimed is:

1. A device configured to jet one or more droplets of a viscous medium, the device comprising:

a housing having one or more housing inner surfaces at least partially defining a jetting chamber configured to hold the viscous medium;

a flexible jetting nozzle, the flexible jetting nozzle having a flexible jetting nozzle inner surface at least partially exposed to the jetting chamber, the flexible jetting nozzle including a flexible conduit extending between a flexible jetting nozzle inlet orifice in the flexible jetting nozzle inner surface to a flexible jetting nozzle outlet orifice in a flexible jetting nozzle outer surface; and an impacting device including an impact end surface at least partially defining the jetting chamber, the impacting device being configured to build up a rapid pressure impulse in the jetting chamber such that the rapid pressure impulse:

causes an increase of an internal pressure of the viscous medium in the jetting chamber to cause at least a portion of the flexible jetting nozzle to deform, to cause a cross-sectional flow area of at least a portion of the flexible conduit to dilate, and to force the one or more droplets of the viscous medium through the flexible conduit and through the flexible jetting nozzle outlet orifice, and causes a decrease of the internal pressure of viscous medium in the jetting chamber, to cause at least the portion of the flexible jetting nozzle to relax, to cause the cross-sectional flow area of at least the portion of the flexible conduit to contract, thereby inducing break-off of the one or more droplets, wherein the impacting device is configured to cause the increase in the internal pressure of the viscous medium in the jetting chamber based on causing at least the impact end surface to move through at least a portion of a space at least partially defined by the one or more housing inner surfaces to reduce a volume of the jetting chamber, and wherein the impacting device is configured to cause the decrease in the internal pressure of the viscous medium in the jetting chamber based on causing at least the impact end surface to move through at least the portion of the space to increase the volume of the jetting chamber.

2. The device of claim 1, wherein the impacting device includes a piezoelectric actuator.

3. The device of claim 1, wherein the flexible jetting nozzle is configured to reversibly deform to cause the cross-sectional flow area of the flexible conduit to reversibly dilate in response to reversible variation of the internal pressure of the viscous medium in the jetting chamber.

4. The device of claim 1, wherein the flexible jetting nozzle is configured to deform to cause the cross-sectional flow area of the flexible conduit to dilate by about 200% to about 400% in response to the increase of the internal pressure of the viscous medium in the jetting chamber.

5. The device of claim 1, further comprising:

a rigid jetting nozzle, the rigid jetting nozzle having an having a rigid jetting nozzle inner surface and a rigid jetting nozzle outer surface, the rigid jetting nozzle including a rigid conduit extending between a rigid jetting nozzle inlet orifice in the rigid jetting nozzle inner surface and a rigid jetting nozzle outlet orifice in the rigid jetting nozzle outer surface, wherein the flexible jetting nozzle is coupled to the rigid jetting nozzle, such that the rigid jetting nozzle is configured to hold the flexible jetting nozzle in place, and the device is configured to cause the internal pressure of the viscous medium in the jetting chamber to increase to force the one or more droplets of the viscous medium through both the flexible conduit and the rigid conduit.

6. The device of claim 5, wherein the rigid jetting nozzle and the housing are a single, uniform part.

7. The device of claim 5, wherein the rigid jetting nozzle is at least partially between the flexible jetting nozzle and the jetting chamber, such that the flexible jetting nozzle is at least partially isolated from the jetting chamber by the rigid jetting nozzle.

8. The device of claim 5, wherein the flexible jetting nozzle is at least partially between the rigid jetting nozzle and the jetting chamber.

9. The device of claim 8, wherein the flexible conduit extends at least partially through the rigid conduit.

10. A method for controlling a jetting of one or more droplets of a viscous medium from a jetting chamber of a device and through a flexible jetting nozzle of the device, the device including a housing having one or more housing inner surfaces at least partially defining the jetting chamber and an impacting device, the flexible jetting nozzle having a flexible jetting nozzle inner surface at least partially exposed to the jetting chamber, the flexible jetting nozzle including a flexible conduit extending between a rigid jetting nozzle inlet orifice in the flexible jetting nozzle inner surface to a flexible jetting nozzle outlet orifice in a flexible jetting nozzle outer surface of the flexible jetting nozzle, the flexible jetting nozzle including a flexible material, wherein the method includes building up a rapid pressure impulse in the jetting chamber, the rapid pressure impulse:

causing an internal pressure of the viscous medium in the jetting chamber to increase to cause at least a portion of the flexible jetting nozzle to deform, to cause a cross-sectional flow area of at least a portion of the flexible conduit to dilate and enable the one or more droplets to pass through the flexible conduit and through the flexible jetting nozzle outlet orifice; and causing the internal pressure of the viscous medium in the jetting chamber to decrease to cause the portion of the flexible jetting nozzle to relax, to cause the cross-sectional flow area of the portion of the flexible conduit to contract and thereby inducing break-off of the one or more droplets, wherein the increase in the internal pressure of the viscous medium in the jetting chamber is based on causing the impacting device to move through at least a portion of a space at least partially defined by the one or more housing inner surfaces to reduce a volume of the jetting chamber, and wherein the decrease in the internal pressure of the viscous medium in the jetting chamber is based on causing the impacting device to move through at least the portion of the space to increase the volume of the jetting chamber.

11. The method of claim 10, wherein the increase in the internal pressure of the viscous medium in the jetting chamber causes the portion of the flexible jetting nozzle to deform from a rest state to a deformed state, to cause the cross-sectional flow area of the portion of the flexible conduit to dilate from a first area to a second area, the second area greater than the first area; and the decrease in the internal pressure of the viscous medium in the jetting chamber causes the portion of the flexible jetting nozzle to relax from the deformed state to the rest state, to cause the cross-sectional flow area of the portion of the flexible conduit to contract from the second area to the first area.

12. The method of claim 11, wherein the second area is about 200% to about 400% greater than the first area.

13. The method of claim 10, wherein the impacting device includes a piezoelectric actuator.

14. The method of claim 10 wherein the flexible jetting nozzle is at least partially isolated from the jetting chamber by a rigid jetting nozzle, such that the increase in the internal pressure of the viscous medium in the jetting chamber causes a limited portion of the flexible jetting nozzle that is exposed to the jetting chamber by the rigid jetting nozzle to deform while a remainder portion of the flexible jetting nozzle that is isolated from exposure to the jetting chamber by the rigid jetting nozzle is restricted in deformation.

15. The method of claim 10, wherein the flexible jetting nozzle is at least partially between the jetting chamber and a rigid jetting nozzle, the rigid jetting nozzle including a rigid conduit, such that the increase in the internal pressure of the viscous medium in the jetting chamber causes a limited portion of the flexible jetting nozzle that is aligned with the rigid conduit to deform while a remainder portion of the flexible jetting nozzle that is not aligned with the rigid conduit is restricted in deformation by the rigid jetting nozzle.

16. The method of claim 15, wherein the limited portion of the flexible conduit extends at least partially through the rigid conduit.

* * * * *